(12) United States Patent
Paruchuri et al.

(10) Patent No.: US 12,175,517 B2
(45) Date of Patent: Dec. 24, 2024

(54) SYSTEM, METHOD, AND MEDIUM FOR LEAD CONVERSION USING A CONVERSATIONAL VIRTUAL AVATAR

(71) Applicant: ACCENTURE GLOBAL SOLUTIONS LIMITED, Dublin (IE)

(72) Inventors: Anwitha Paruchuri, San Jose, CA (US); Guanglei Xiong, Pleasanton, CA (US); Lan Guan, Johns Creek, GA (US); Jayashree Subrahmonia, San Jose, CA (US); Yuan He, Los Angeles, CA (US); Louise Noreen Barrere, Torrance, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 510 days.

(21) Appl. No.: 17/497,494

(22) Filed: Oct. 8, 2021

(65) Prior Publication Data

US 2023/0111633 A1    Apr. 13, 2023

(51) Int. Cl.
*G06Q 30/0601* (2023.01)
*G06F 40/35* (2020.01)
(Continued)

(52) U.S. Cl.
CPC ......... *G06Q 30/0631* (2013.01); *G06F 40/35* (2020.01); *G06Q 30/015* (2023.01);
(Continued)

(58) Field of Classification Search
CPC .......... G06Q 30/0631; G06Q 30/0201; G06Q 30/0613; G06Q 30/015; G06F 40/35; G06T 13/205; G06T 13/40; G06T 17/20
(Continued)

(56) References Cited

U.S. PATENT DOCUMENTS 10,387,963 B1 *  8/2019  Leise ............... H04M 3/527
2010/0058183 A1 *  3/2010  Hamilton, II ...... G06Q 30/02
715/706

(Continued)

OTHER PUBLICATIONS

Aman, "Virtual Avatar Explained in Depth", (2021) https://www.iamdave.ai/blog/virtual-avatar-explained/ (Year: 2021).*

*Primary Examiner* — Marissa Thein
*Assistant Examiner* — Zachary Ryan Donahue
(74) *Attorney, Agent, or Firm* — Mannava & Kang, P.C.

(57) ABSTRACT

A system and method for lead conversion using conversational virtual avatar is disclosed. System comprising processor causes Conversation Virtual Avatar Platform (CVAP) to receive, for first entity, from lead prioritization engine, leads applicable to first entity via lead repository based on scores associated with respective leads. Processor causes CVAP to receive, through conversation management engine (CME) configured in CVAP, from leads, responses to questions pertaining to product attributes and information pertaining to lead. The processor causes CVAP to process responses to determine action and/or state, which includes whether to issue additional product-attribute based questions through Virtual Avatar (VA) using Response To Motion Module (RTME) or to, through recommender engine that uses recommendation model, in real-time, recommend products associated with first entity to respective at least one lead based on any or combination of responses received from lead, information pertaining to lead, and products ordered by entities similar to lead.

14 Claims, 15 Drawing Sheets

(51) Int. Cl.
*G06Q 30/015* (2023.01)
*G06Q 30/0201* (2023.01)
*G06T 13/20* (2011.01)
*G06T 13/40* (2011.01)
*G06T 17/20* (2006.01)

(52) U.S. Cl.
CPC ..... *G06Q 30/0201* (2013.01); *G06Q 30/0613* (2013.01); *G06T 13/205* (2013.01); *G06T 13/40* (2013.01); *G06T 17/20* (2013.01)

(58) Field of Classification Search
USPC ....................................................... 705/26.7
See application file for complete search history.

(56) References Cited

U.S. PATENT DOCUMENTS

| | | | |
|---|---|---|---|
| 2014/0164123 A1* | 6/2014 | Wissner-Gross | ............................ G06Q 30/0623 705/26.61 |
| 2018/0005293 A1* | 1/2018 | Adams | ................ G06Q 30/0625 |
| 2019/0188895 A1* | 6/2019 | Miller, IV | ............. G06T 19/006 |
| 2021/0133852 A1* | 5/2021 | Vauthey | ............. G06Q 30/0617 |
| 2021/0134283 A1* | 5/2021 | Adibi | .................. H04M 3/5166 |

* cited by examiner

SYSTEM, METHOD, AND MEDIUM FOR LEAD CONVERSION USING A CONVERSATIONAL VIRTUAL AVATAR

BACKGROUND

Generally, one of the common challenges faced in Business-to-Business (B2B) sales may be cost effective and low touch lead conversion. An Artificial Intelligence (AI) based system may be used to overcome this challenge. Businesses may be rely on AI enabled chatbots to automate sales and lead conversion processes. The sales funnel can be automated with chatbots to prequalify leads by asking specific questions and, based on the response form customer, direct the customer to the appropriate team for further nurturing. Being able to engage customers may increase the number of leads and conversion rates. However, the aforementioned process may pose certain challenges and may not be optimal for an ideal customer experience. Further, when the lead conversion/sales calls are implemented through a chat/voice bot, the leads may result in bias and hang-ups and a short call length. Also, when customers know the conversational partner may not be a human, the customers may be curt and purchase less than they normally would because they perceive the disclosed bat as less knowledgeable and less empathetic. In another instance, when human sales agents are involved in a customer call, the agents may not be comfortable to show their faces. This may also reduce the sales conversion rate with a customer.

Conventional conversational systems may not support recommendation specific tasks and goals such as, for example, what questions to ask regarding product attributes, when to recommend items in the conversation and how to adapt to the user's dynamic feedback. Lack of recommendation goal oriented conversational agents may lead to not having a suitable integration between recommendation inputs/outputs and a Dialogue Management system (DLM) inputs/outputs. Therefore, conventional systems may not capture the real-time user feedback from conversations causing the recommendation results to be sub-optimal. Further, conventional systems may lack a recommendation pipeline for missing attributes/entities in the question. For instance, in a conversation, the parameters for a recommendation question may not be available all at once. Furthermore, the conventional systems may lack emotional intelligence in chat bots. Conventional systems may include models to predict the visemes and the facial expressions from audio, and may also include models to convert text to speech if audio is not directly available. However, there may be no consolidated learning architecture in conventional systems for generating the predictions of body gestures along with facial expressions and lip movements synchronized and trained end-end directly from an audio. This may be important because, synchronization may complement the speech and adds non-verbal cues that help listeners comprehend better.

Furthermore, conventional systems may lack personalization of avatars. For example, the virtual avatars in the market may use a preset avatar, which may not allow an agent to change the appearance or customize the behavior of the avatar. This may make it difficult for a human agent to have a personalized communication with customers. In addition, conventional systems may lack the ability to add a human in the loop for virtual avatars. For example, most of the conventional virtual avatar solutions may not include an interface for the human agent to step into the loop when needed. This means when there is a question that the virtual avatar cannot answer, the process may end with a failure.

SUMMARY

An embodiment of present disclosure includes a system including a conversational virtual avatar platform (CVAP) operatively coupled with a processor. The processor may cause the platform to receive, for a first entity, from a lead prioritization engine, a plurality of leads applicable to the first entity via a lead repository based on scores associated with the respective plurality of leads. The processor may cause the platform to receive, through a conversation management engine (CME) configured in the CVAP, from at least one lead of the plurality of leads, responses to questions pertaining to one or more product attributes and information pertaining to the at least one lead. The questions may be issued through a Virtual Avatar (VA) that may be associated with the CME. The questions pertaining to the one or more product attributes may incrementally generated through a slot-filling mechanism, and wherein the recommender engine may also be triggered based on the slot-filling mechanism. The VA may be a virtual hybrid avatar that may be configured such that, based on processing of the responses, upon determination that a human response may be required for next action during interaction with the at least one lead, an audio and/or video response of a human agent may be issued to the at least one lead through the CME such that the at least one lead continues seamless interaction during the session.

The processor may cause the platform to process the responses to determine at least one of an action and state, which includes whether La issue an additional product-attribute based question through the VA or La, through a recommender engine that uses a recommendation model, in real-Lime, recommend one or more products associated with the first entity to the respective at least one lead based on any or a combination of the responses received from the at least one lead, the information pertaining to the at least one lead, and products ordered by entities similar to the at least one lead. The recommender engine may be associated with a recommendation pipeline that may be triggered at each instance of the determination. The determining at least one of an action and state, is decided by a state/policy network based on vector representations associated with product-attribute preferences of the at least one lead, feedback from conversation history of past leads, and current length of the conversation. The recommendation model may be selected from any or a combination of fuzzy filtering model, Variational Autoencoder for Collaborative Filtering (VAECF), content filtering model, k-Nearest Neighbour model, and deep learning model. The recommendation model may be selected based on intent classifications and slots/entities that may be extracted from the responses to the questions pertaining to one or more product attributes, and further selected based on parameters associated with the first entity and the information pertaining to the at least one lead.

Further, the system may include a response to motion engine (RTME) operatively coupled to the CVAP in a manner such that pose coordinates from the audio response may be predicted using a multi-modal neural network architecture, and subsequently combined with lip synchronization and facial expressions for translation onto a static source image that corresponds to the VA to generate required motions. The source image may be processed with audio of the human agent to generate a recovered reference body/face mesh. The source Image may be processed with a reference video frame from camera of the human agent to generate a recovered source body/face mesh such that the reference and source meshes may be processed through a vector transformation to generate a flow that may be indicative of VA's movement. The RTME may include a body generator that processes, through the neural network, body portion extracted from the source image, the reference body mesh, and the flow to generate body motion frames. The RTME may include a face generator that processes, through the neural network, face portion extracted from the source image, the reference face mesh, and the flow to generate face motion frames. Further, any or a combination of facial expressions, lip synchronization, body movements, and body poses of the human agent may be mapped onto the motions of the corresponding VA. The image of the VA may be generated based the corresponding human agent.

Another embodiment of the present disclosure may include a method for lead conversion using conversational virtual avatar. The method may include receiving, for a first entity, from a lead prioritization engine, a plurality of leads applicable to the first entity via a lead repository based on scores associated with the respective plurality of leads. The method may include receiving, through a conversation management engine (CME) configured in the CVAP, from at least one lead of the plurality of leads, responses to questions pertaining to one or more product attributes and information pertaining to the at least one lead. The method may include processing the responses to determine at least one of an action and state, which includes whether to issue an additional product-attribute based question through the VA or to, through a recommender engine that uses a recommendation model, in real-time, recommend one or more products associated with the first entity to the respective at least one lead based on any or a combination of the responses received from the at least one lead, the information pertaining to the at least one lead, and products ordered by entities similar to the at least one lead.

Yet another embodiment of the present disclosure may include a non-transitory computer readable medium comprising machine executable instructions that may be executable by a processor to receive an input data corresponding to a programming language. The processor may receive, for a first entity, from a lead prioritization engine, a plurality of leads applicable to the first entity via a lead repository based on scores associated with the respective plurality of leads. The processor may receive, through a conversation management engine (CME) configured in the CVAP, from at least one lead of the plurality of leads, responses to questions pertaining to one or more product attributes and information pertaining to the at least one lead. The processor may process the responses to determine at least one of an action and state, which includes whether to issue an additional product-attribute based question through the VA or to, through a recommender engine that uses a recommendation model, in real-time, recommend one or more products associated with the first entity to the respective at least one lead based on any or a combination of the responses received from the at least one lead, the information pertaining to the at least one lead, and products ordered by entities similar to the at least one lead.

BRIEF DESCRIPTION OF DRAWINGS

FIGS. 3G and 3H illustrate example user interfaces for automatic recommendation pipeline and conversational dynamic recommendations, respectively, according to an example embodiment of the present disclosure.

DETAILED DESCRIPTION

Figure 1:
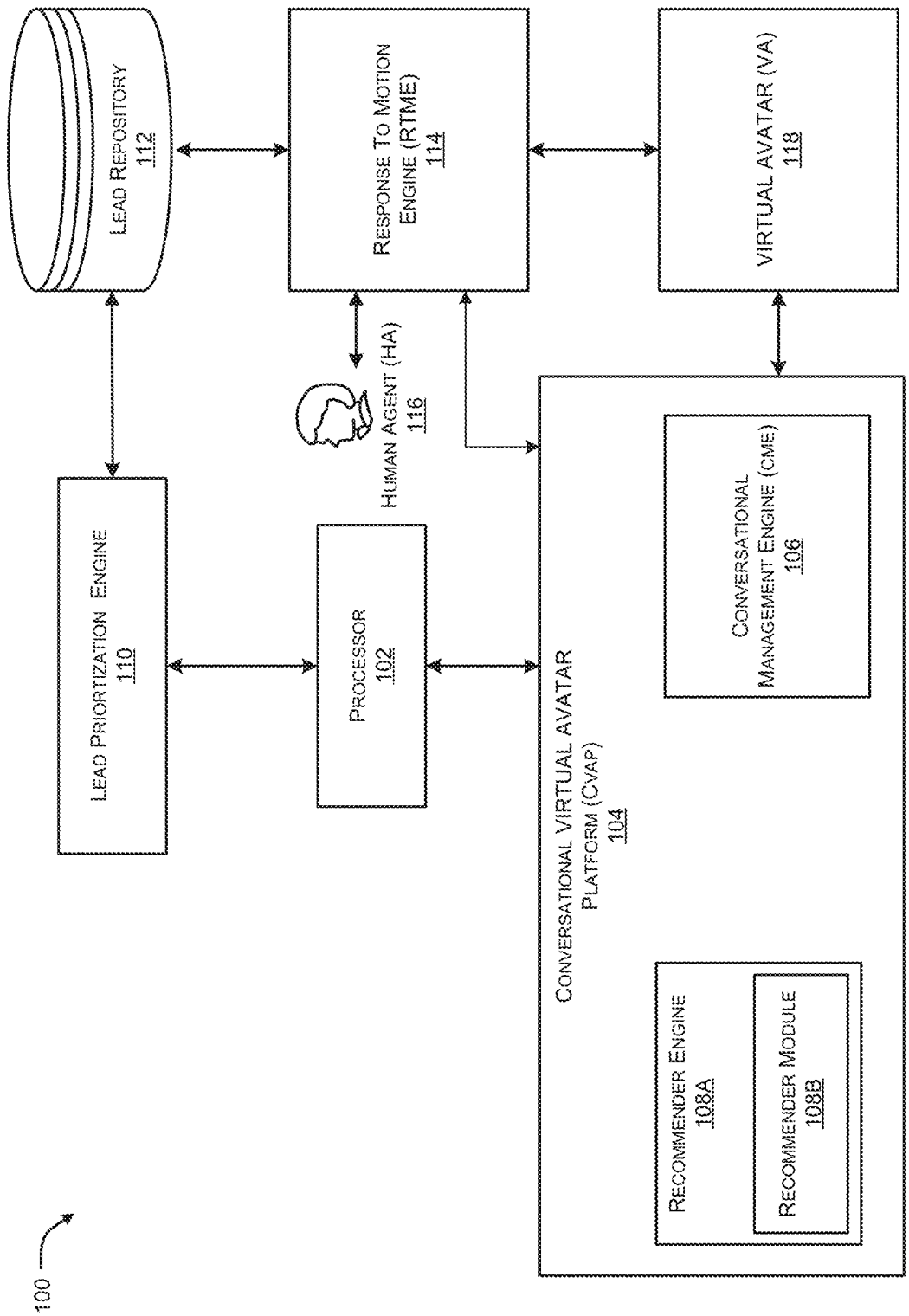
FIG. 1 illustrates a system for lead conversion using conversational virtual avatar, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

OVERVIEW

Various embodiments describe providing a solution in the form of a system and a method for led conversion using a conversational virtual avatar. The system receives, for a first entity, from lead prioritization engine, a plurality of leads applicable to the first entity via a lead repository based on scores associated with the respective plurality of leads. The system may receive, through a conversation management engine (CME) configured in a Conversation Virtual Avatar Platform (CVAP), from at least one lead of the plurality of leads, responses to questions pertaining to one or more product attributes and information pertaining to the at least one lead. The questions may be issued through a Virtual Avatar (VA) that may be associated with the CME. The questions pertaining to the one or more product attributes may incrementally generated through a slot-filling mechanism, and wherein the recommender engine may also be triggered based on the slot-filling mechanism. The VA may be a virtual hybrid avatar that may be configured such that, based on processing of the responses, upon determination that a human response may be required for next action during interaction with the at least one lead, an audio and/or video response of a human agent may be issued to the at least one lead through the CME such that the at least one lead continues seamless interaction during the session.

In an example embodiment, the system may process the responses to determine at least one of an action and state, which includes whether to issue an additional product-attribute based question through the VA or to, through a recommender engine that uses a recommendation model, in real-time, recommend one or more products associated with the first entity to the respective at least one lead based on any or a combination of the responses received from the at least one lead, the information pertaining to the at least one lead, and products ordered by entities similar to the at least one lead. The recommender engine may be associated with a recommendation pipeline that may be triggered at each instance of the determination. The determining at least one of an action and state, is decided by a state/policy network based on vector representations associated with product-attribute preferences of the at least one lead, feedback from conversation history of past leads, and current length of the conversation. The recommendation model may be selected from any or a combination of fuzzy filtering model, Variational Autoencoder for Collaborative Filtering (VAECF), content filtering model, k-Nearest Neighbour model, and deep learning model. The recommendation model may be selected based on intent classifications and slots/entities that may be extracted from the responses to the questions pertaining to one or more product attributes, and further selected based on parameters associated with the first entity and the information pertaining to the at least one lead.

In an example embodiment, the system may include a response to motion engine (RTME) operatively coupled to the CVAP in a manner such that pose coordinates from the audio response may be predicted using a multi-modal neural network architecture, and subsequently combined with lip synchronization and facial expressions for translation onto a static source image that corresponds to the VA to generate required motions. The source image may be processed with audio of the human agent to generate a recovered reference body/face mesh. The source image may be processed with a reference video frame from camera of the human agent to generate a recovered source body/face mesh such that the reference and source meshes may be processed through a vector transformation to generate a flow that may be indicative of VA's movement. The RTME may include a body generator that processes, through the neural network, body portion extracted from the source image, the reference body mesh, and the flow to generate body motion frames. The RTME may include a face generator that processes, through the neural network, face portion extracted from the source image, the reference face mesh, and the flow to generate face motion frames. Further, any or a combination of facial expressions, lip synchronization, body movements, and body poses of the human agent may be mapped onto the motions of the corresponding VA. The image of the VA may be generated based the corresponding human agent.

Exemplary embodiments of the present disclosure have been described in the framework of improved low touch lead conversion using a hybrid virtual avatar that can accurately replicate a sales agent persona very. In an example embodiment, the system and method of the present disclosure may be used to interactive Business to Business (B2B) sales/lead conversion pipeline for client projects. However, one of ordinary skill in the art will appreciate that the present disclosure may not be limited to such applications. Embodiments of the present disclosure may be applicable in other domains such as targeted advertising and so on. In an example embodiment, a recommender engine may create a parametric integration between the recommendation and the conversation management models to tune this network for predicting when to request, recommend and respond in reap time during a sales conversation. In an example embodiment, an incremental question generation may be provided through user preference elicitation. The attributes in a question may be incrementally generated through slot-filling approach. Based on the slots filled at the current instant of time the corresponding recommendation pipeline may be triggered. Further, multi modal learning for audio/text to semantic motion translation using a neural network architecture may be used to predict the pose coordinates from audio, combine them with lip synchronization and facial expressions to translate on to the static avatar source image to generate the required motions. In an example embodiment, a personalized virtual avatar such as avatar creation from a single image may be provided using only a single image uploaded by a human agent. Each human agent can have his/her own virtual avatar, therefore enabling the human agent to establish a personal connection with their customers. Further, a hybrid virtual avatar may automatically respond to most questions from the customer. In the case where a human agent's involvement may be needed, the human agent may be introduced into the loop to input with audio and/or video, and the process transfers seamlessly. A fine-tuned posture may model a camera perspective parameter to improve result video stability. Further, a pre-processed driving videos with super resolution may be used to improve lip synchronization quality. Furthermore, establishment of end to end pipeline with two models may achieve synchronized body posture and lip movements.

FIG. 1 illustrates a system 100 for lead conversion using conversational Virtual Avatar (VA) 118, according to an example embodiment of the present disclosure. The system 100 may be implemented by way of a single device or a combination of multiple devices that may be operatively connected or networked together. The system 100 may be implemented in hardware or a suitable combination of hardware and software. The system 100 includes a processor 102. The system 100 may include a conversational virtual Avatar platform (CVAP) 104, a lead prioritization engine 110, a response to motion engine (RTM) 114, and a Virtual Avatar (VA). The CVAP 104 may further include a recommender engine 108A and a conversation management engine (CME) 106. The recommender engine 108A may further include a recommender module 108B. A lead repository 112 may be associated with the lead prioritization engine 110. A human agent 116 may be associated with suitable computing device (not shown in FIG. 1) which may be communicatively coupled to the system 100 via the response to motion engine (RTM) 114.

The system 100 may be a hardware device including the processor 102 executing machine-readable program instructions to perform lead conversion using conversational virtual avatar. Execution of the machine-readable program instructions by the processor 102 may enable the proposed system 100 to lead conversion using conversational virtual avatar. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system WO for performing tasks such as data processing, input/output processing, feature extraction, and/or any other functions. Any reference to a task in the present disclosure may refer to an operation being or that may be performed on data.

In an example embodiment, the processor 102 may cause the CVAP 104 to receive, for a first entity, from the lead prioritization engine 110, a plurality of leads applicable to the first entity via the lead repository 112, based on scores associated with the respective plurality of leads. The first entity may include, but not limited to, a company, a competitor, a product, a service, and the like. The processor 102 may cause the CVAP 104 to receive, through the conversation management engine (CME) 106 configured in the CVAP 104, from at least one lead of the plurality of leads, responses to questions pertaining to one or more product attributes and information pertaining to the at least one lead. The questions may be issued through the Virtual Avatar (VA) 118 that may be associated with the CME 106. The questions pertaining to the one or more product attributes may incrementally generated through a slot-filling mechanism. The recommender engine 108A may also triggered based on the slot-filling mechanism. The VA 118 may be a virtual hybrid avatar that may be configured such that, based on processing of the responses, upon determination that a human response may be required for next action during interaction with the at least one lead, an audio and/or video response of the human agent 116 may be issued to the at least one lead through the CME 106 such that the at least one lead continues seamless interaction during the session.

In an example embodiment, the processor 102 may cause the CVAP 104 to process the responses to determine at least one of an action and state, which includes whether to issue an additional product-attribute based question through the VA 118 or to, through the recommender engine 108A that uses the recommendation model 108B, in real-time, recommend one or more products associated with the first entity to the respective at least one lead based on any or a combination of the responses received from the at least one lead, the information pertaining to the at least one lead, and products ordered by entities similar to the at least one lead.

In an example embodiment, the recommender engine 108A may be associated with a recommendation pipeline that may be triggered at each instance of the determination. The determining at least one of an action and state, is decided by a state/policy network based on vector representations associated with product-attribute preferences of the at least one lead, feedback from conversation history of past leads, and current length of the conversation. The recommendation module 108B may be selected from at least one of, but not limited to, of fuzzy filtering model, Variational Autoencoder for Collaborative Filtering (VAECF), content filtering model, k-Nearest Neighbour model, and deep learning model, and the like. The recommendation module 108B may be selected based on intent classifications and slots/entities that may be extracted from the responses to the questions pertaining to one or more product attributes, and further selected based on parameters associated with the first entity and the information pertaining to the at least one lead.

Further, the system 100 may include the response to motion engine (RTME) 114 operatively coupled to the CVAP 104 in a manner such that pose coordinates from the audio response may be predicted using a multi-modal neural network architecture. Further, the response to motion engine (RTME) 114 operatively coupled to the CVAP 104 in a manner such that subsequently combined with lip synchronization and facial expressions for translation onto a static source image that corresponds to the VA 118 to generate required motions. The source image may be processed with audio of the human agent 116 to generate a recovered reference body/face mesh. The source image may be processed with a reference video frame from camera of the human agent 116 to generate a recovered source body/face mesh such that the reference and source meshes may be processed through a vector transformation to generate a flow that may be indicative of VA's 118 movement. The RTME 114 may include a body generator (not shown in FIG. 1) that processes, through the neural network, body portion extracted from the source image, the reference body mesh, and the flow to generate body motion frames. The RTME 114 may include a face generator (not shown in FIG. 1) that processes, through the neural network, face portion extracted from the source image, the reference face mesh, and the flow to generate face motion frames. Further, any or a combination of facial expressions, lip synchronization, body movements, and body poses of the human agent 116 may be mapped onto the motions of the corresponding VA 118. The image of the VA 118 may be generated based the corresponding human agent 116.

Figure 2:
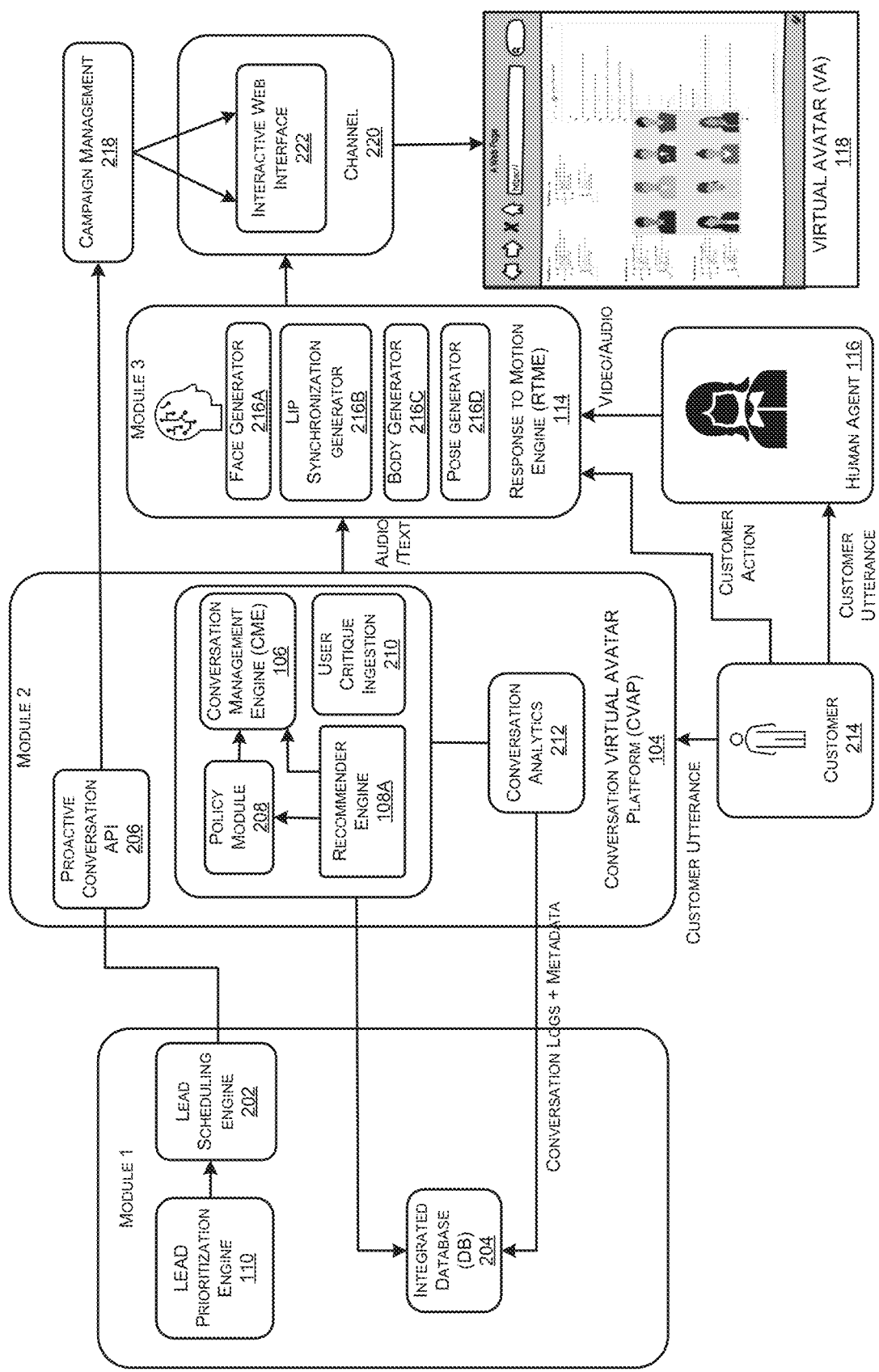
FIG. 2 illustrates a flow diagram depicting components of the system of FIG. 1, according to an example embodiment of the present disclosure.

FIG. 2 illustrates a flow diagram depicting components of the system 100 of FIG. 1, according to an example embodiment of the present disclosure. As illustrated in FIG. 2 and as explained in the description of FIG. 1, the system 100 may include the CVAP 104, the CME 106, the recommender engine 108A the lead prioritization engine 110, the RTME 114, the human agent 116, and the VA 118. Further, the components of the system 100 may include module 1, module 2, and module 3 as shown in FIG. 2.

The module 1 may be a lead generation module which includes the lead prioritization engine 110, a lead scheduling engine 202, and may be associated with an integrated Database (DB) 204. Further, the module 2 may be the CVAP 104, which includes a proactive conversation Application Programming Interface (API), a policy module 208, conversation analytics 212, a user critique ingestion 210, the CME 106, and the recommender engine 108A. Further the module 3 may be a RTME 114, which includes a face generator 216A, a lip synchronization generator 216B, a body generator 216C, and a pose generator 216D. The module 2 and module 3 may be communicatively coupled to the interactive web interface 222 associated with a channel 220. The module 2 may be communicatively coupled to the interactive web interface 222 via a campaign management 218. The interactive web interface 222 may output the VA 118. The human agent 116 may be associated with the RTME 114. A customer utterance of a customer 214 may be inputted to the CVAP 104 and to human agent 116. A customer action of the customer 214 may be inputted to the RTME 114. Further, the conversation analytics 212 may transmit conversation logs and metadata attributes of the utterance to the integrated DB 204. Further, the recommender engine 108A may transmit recommendations of, for example, products, to the integrated DB 204. The leads may be transmitted to the proactive conversation API 206. Further, the audio/text of utterance, from the CVAP 104 may be transmitted to the RTME 114.

For instance, the system 100 may help in converting leads into customers, where leads may be, but not limited to, small, medium, large business, and the like. In an example embodiment, the module 1 may include lead generation module (not shown in FIG. 1), which may be Intelligent Revenue Generation (IRG) module, which generates leads using at least one of, but not limited to, a propensity modelling, a knowledge graph(s), and the like.

Figure 3A:
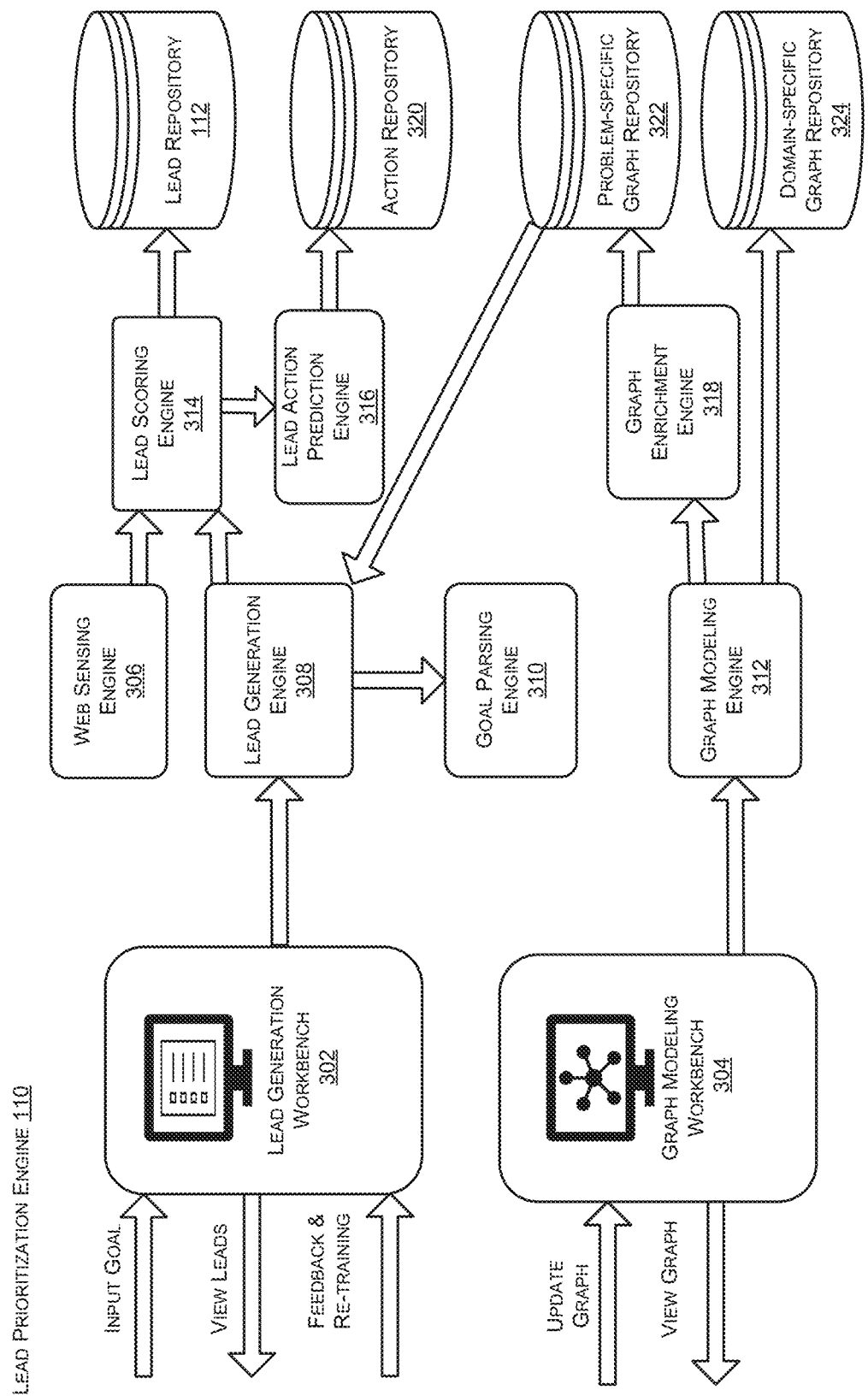
FIG. 3A illustrates a flow diagram depicting lead prioritization/lead detection using lead prioritization engine of FIG. 2, according to an example embodiment of the present disclosure.

The lead prioritization engine 110 may further include sub-modules and databases as shown in FIG. 3A. Consider a scenario, the customer 214 may provide preferences, to a lead generation workbench 302. The lead generation workbench 302 may send the preferences to a lead generation engine 308. Further, the generated leads from the lead generation engine 308 may be sent to a lead scoring engine 314 for providing score to the generated leads. Further, dynamic signals present on the web, for example, at least one of but not limited to, revenue of a company, quarterly and yearly financial news, digital presence on social media or platform which has crowd-sourced reviews about businesses, activity on review platforms, ratings, and the like, may be captured using a web sensing engine 306. The dynamic signals may be converted into attributes to enhance the score for the leads using the lead scoring engine 314. The scoring of the leads may be performed for every lead and rank the leads to further narrow the generated leads and convert the leads into potential customers. The scored leads may be stored in a lead repository 112.

For instance, a client may provide first party data which may have 10,000 leads, then the lead prioritization engine 110 may enrich the first party data with third party and other data sources to provide, for example, 100,000 leads for the client. The lead prioritization engine 110 may rank the leads and prioritize the leads, so that the client may be aware of which companies to go after. The lead prioritization engine 110 may use knowledge graphs to score the leads, based on, but not limited to, an industry and an industry type, employees, sales volume, and the like. Which may be metrics from the knowledge graph. The knowledge graphs may be called using a graph modeling engine 312.

Further, from the scored leads, a lead action prediction engine 316 may predict action to be performed based on the leads and store in an action repository 320. From the input of the customer 214, the goal of the customer 214 may be determined by a goal parsing engine 310. Further, the lead generation workbench 302 may provide leads to the human agent 116, the human agent 116 may provide feedback and the lead generation workbench 302 may be trained based on the provided feedback.

Further, a graph may be updated in a graph modeling workbench 304 by the human agent 116, and a graph modeling engine 312 may take the updated graph and provide to a graph enrichment engine 318 to enrich the graph based on the specific problem and store in a problem-specific graph repository 322. Further, if the graph may be domain specific, then the graph may be stored in a domain specific graph repository 324. The same graph may be viewed via the graph modeling engine 312.

Once the leads may be generated, human agent 116 and recommender engine 108A may be used as lead conversion pipeline. The module 2 may be the CVAP 104. The CME 106 may include a Natural Language Understanding (NLU) module (not shown in FIG. 2) and the recommender engine 108A, which may be integrated using a policy network such as policy module 208, to covert customer into a potential lead. The recommender engine 108A may recommend an action to the CME 106, whether it is time to send response to recommend a product or ask new question through the VA 118, to the customer 214 to get more preferences into the CVAP 104. Based on generating the response using CVAP 104, the generated response may be transmitted to the RTME 114. In an instance, the RTME 114 may generate several human oriented motions using audio or text generated by the CVAP 104. The human oriented motions may be communicated to the customer 214 through the interactive web interface 222 using the VA 118.

Consider a scenario, for instance, the VA 118 may not be able to answer some of the questions form the customer 214, then the human agent 116 may enter into the loop to help track motions of the VA 118, by sending the audio and video of the human agent 116, instead of audio and video from the CVAP 104. In this scenario, the coordinates from the video or audio of the human agent 116 may be extracted by the CVAP 104 and send to the RTME 114. The RTME 114 may again translate the coordinates to the avatar such as VA 118. In this scenario, the human agent 116 may drive the VA 118 instead of CVAP 104. The system 100 may allow the customer 214 to communicate the preferences and, the system may use the preferences of the user as a feedback input to send the preferences to the policy module 208 to judge what question to ask to the customer 214, rather than pre-defined questions.

Figure 3B:
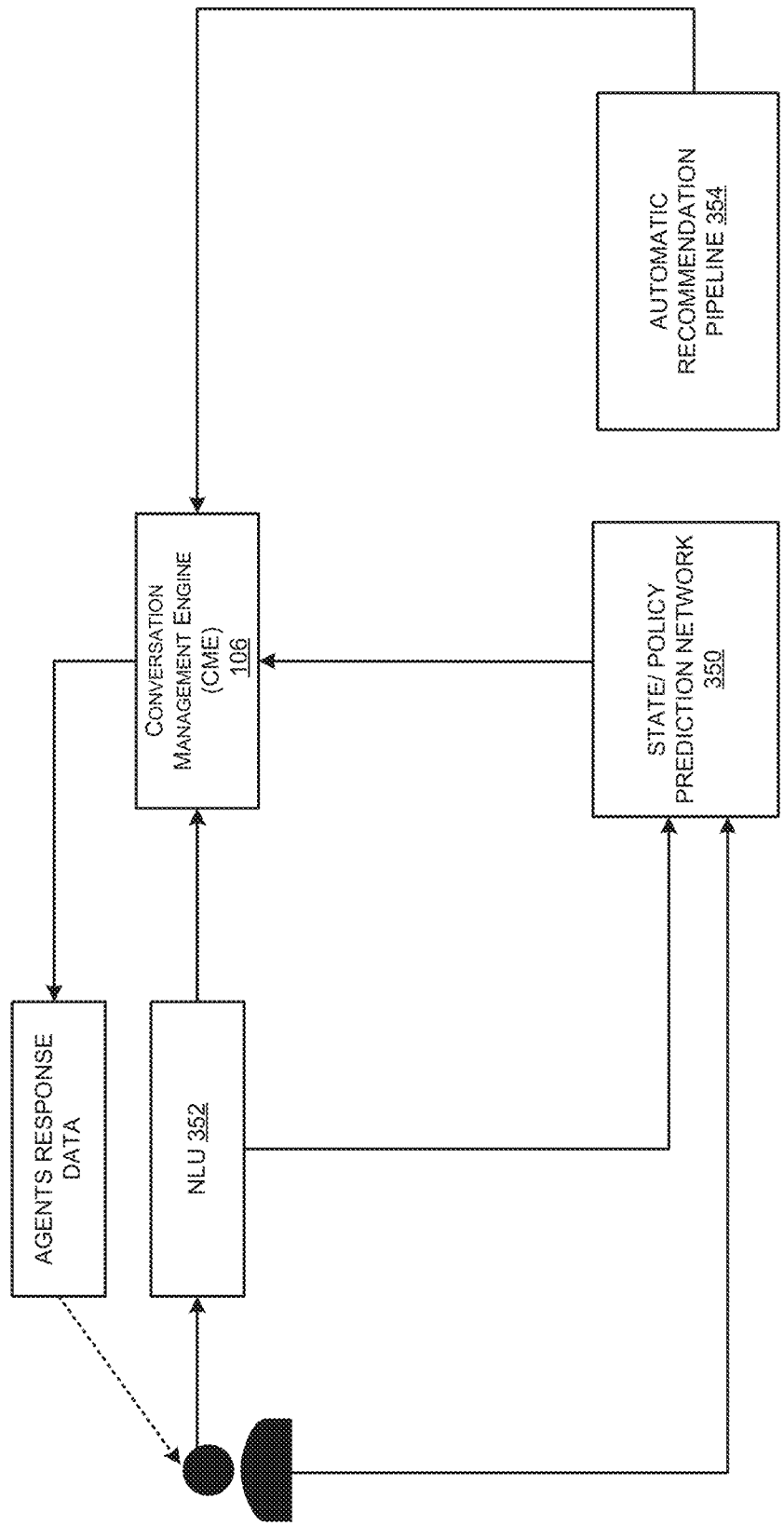
FIG. 3B illustrates an example flow diagram of Conversation Virtual Avatar Platform (CVAP) of FIG. 2, according to an example embodiment of the present disclosure.
Figure 3C:
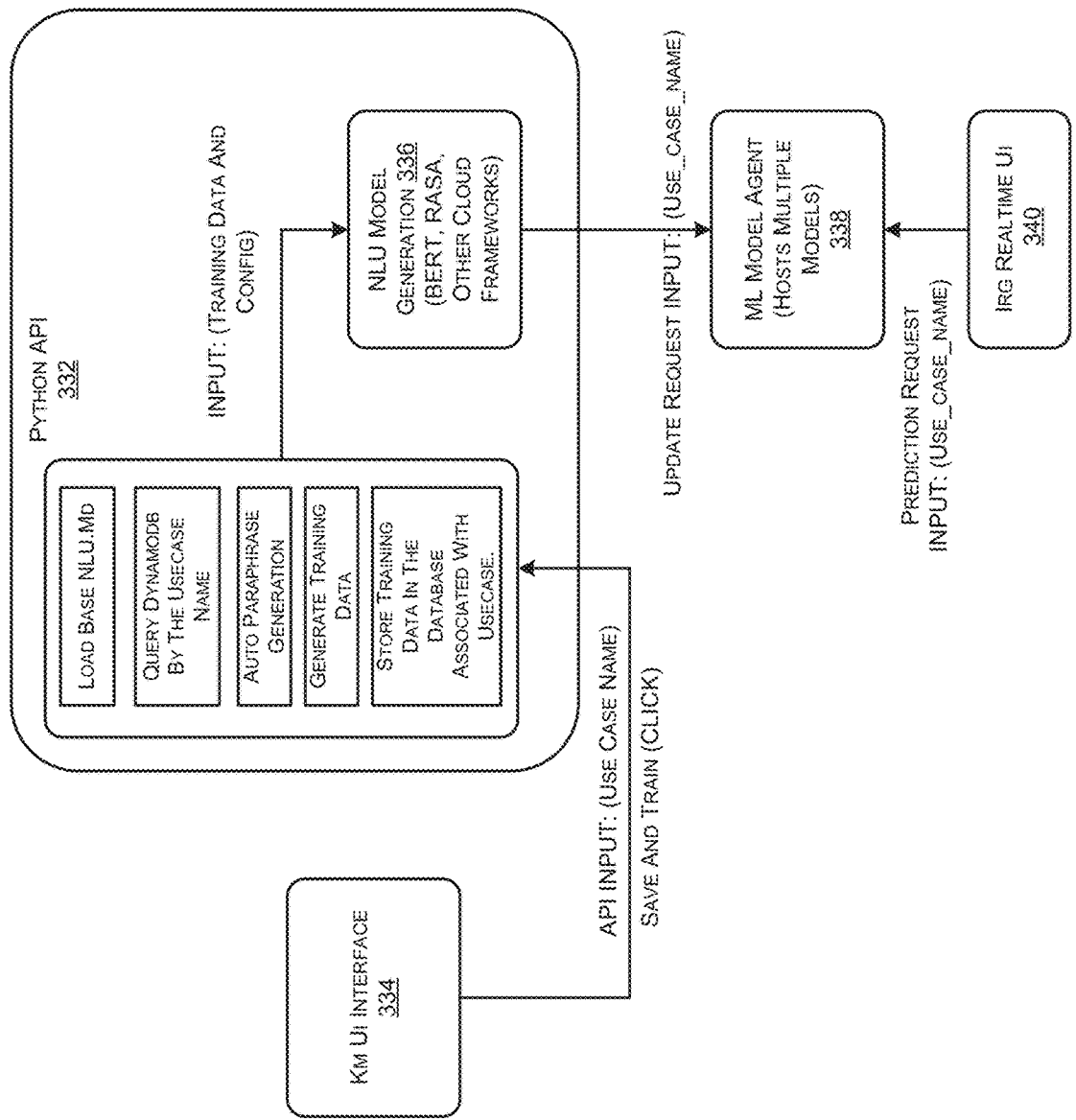
FIG. 3C illustrates an example flow diagram of Natural Language Understanding (NLU) module of FIG. 3B, according to an example embodiment of the present disclosure.

FIG. 3B illustrates an example flow diagram of Conversation Virtual Avatar Platform (CVAP) 104 of FIG. 2, according to an example embodiment of the present disclosure. For instance, the CVAP 104 may include a Natural language Understanding (NLU) module 352, a state/policy prediction network 350, the CME 106, an automatic recommendation pipeline 354. For example, once the leads may be generated from the module 1, the generated leads may be sent to the automatic recommendation pipeline 354. Even if there may be no preferences from the customer 214, automatic recommendation pipeline 354 may provide recommendation to the customer 214.

Figure 3D:
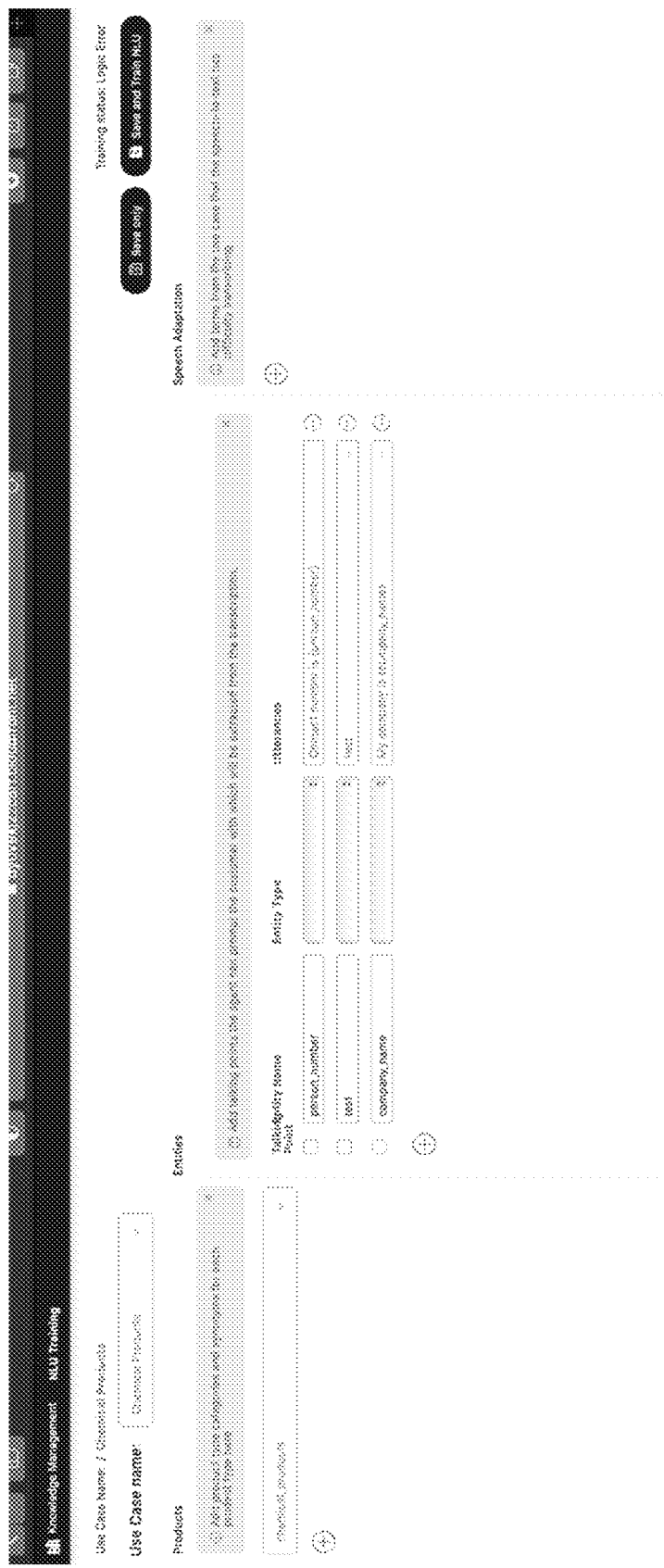
FIG. 3D illustrates an example user interface for training of Natural Language Understanding (NLU) module of FIG. 3B, according to an example embodiment of the present disclosure.

The NLU 352 may perform intent detection and entity extraction from the customer utterances and then send the corresponding encodings of the product attributes (entities), utterances themselves and the length of the conversation to the policy prediction network ($S_t$) 350. The NLU 352 may be trained using an interface as shown in FIG. 3D. For instance, there may be two main components of the NLU training pipeline in IRG realtime User Interface (UI) 340, which may be a model generation from the Knowledge Management (KM) interface 334, and inference from the realtime application such as real-time time UI 340 as shun in FIG. 30.

A model generation from the KM interface 334 may include: The NLU module 352 may mainly be composed of two training pipelines such as one for the intent classification model and the second may be for the entity extraction model.

An Intent Classifier Model Configuration:

The most important intent may be the customer request which may be trained on utterances to detect point in the conversation where the customer 214 may have specified the intention of the call and specified his/her interest in a product type. The product types can be specific to use cases and hence the business user (such as human agent 116 or employee or employer) can configure the product types relevant to the use case using the KM user interface 334, to recognize the customer request from the call based on this data. The business user can also specify some synonyms for the product types to make the model more robust to detect the customer request intent. For example, intent classifier may determine which products the customer is interested, or the user is unhappy (i.e., feedback intent).

Entity Recognizer Model Configuration:

For instance, in a live conversation, the NLU 352 may extract a set of entities that forms a structured format, and this may be further in the downstream recommendation pipeline for dynamic question building. The business user can configure the entities to be trained relevant to the use case using the KM interface by picking one of the built-in entities or use train the custom entities. In this flow the utterances provided by the customer 214 may be used to fine-tune the entity extraction model. To train for the custom entities a Conditional Random Field (CRF) model or sequence-seq model may be used in the backend. When the business user first uploads the product catalog dataset and picks and chooses the product attributes, these attributes may be auto-populated.

For example, the utterances from the customers or the users may need to be extracted to determine the products required by the customers. For example, the customer may utter that the customer like shirts that are red in color, the entity recognizer model may need to know that red may be one attribute and relevant to use case. Then the entity recognizer model may need to identify the value of the attributes i.e., red. The entity may be color and value may be red. Once the entity recognizer model identifies value of the attributes, then the attributes may be provided to the recommender engine 108A associated with the use case question, then the automatic recommendation pipeline 354 may be triggered.

Based on training via the KM interface 334, the use case question input may be obtained. A base NLU model may be loaded and the base NLU model may question dynamo database based on the use case name. Further, the base NLU model may auto paraphrase the generation. Further, the base NLU model may generate training data and store the training data in the database associated with the use case. The trained data and configuration data may be provided as an input to the NLU model generation 336. The NLU model may include, but not limited to a Bidirectional Encoder Representations from Transformers (BERT) model, a RASA model, cloud frameworks, and the like. The generated NLU model may appropriately update the request of the use case and transmit to a Machine Learning (ML) model agent 338 which include multiple models. The real-time UI 340 may also input prediction request of the use case to the ML model agent 338.

For example, during training the business user such as the human agent 116 may choose product catalogue data of use case. Based on the product catalogue data there may be no assumptions from the CVAP 104. Based on the kind of data may be received from the customer 214, there may be label data or list of products with attributes. If there is more information then the recommendation of products may be better, and even with no information from the customer 214 the recommendation may be provided based on policy attributes.

Figure 3E:
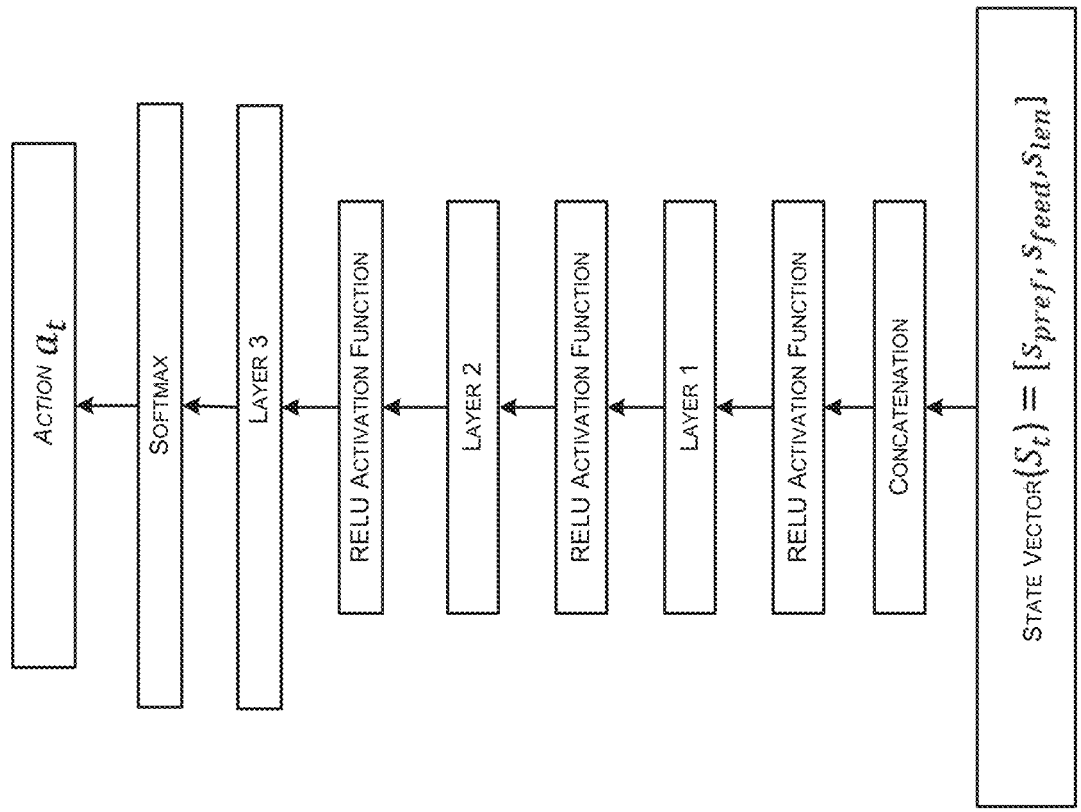
FIG. 3E illustrates an example flow diagram of state/policy prediction network of FIG. 3B, according to an example embodiment of the present disclosure

Referring back to FIG. 3B, the CVAP 104 may provide the attributes from the NLU 352 to the state/policy network 350. The pipeline of the state/policy network 350 is shown in FIG. 3E. The state/policy network 350 may be a deep policy network to manage the CVAP 104. Input state vector ($S_t$) may be a concatenation of three component vectors that encode signal from different perspective such as, useful product attributes, good time to push a recommendation. For example, the state/policy network 350 need to know when to stop the conversation and recommend products, or too early for recommendation or when question has zero inputs. The input state vector ($S_t$) may be as shown below in equation 1:

$$\text{State Vector}(S_t)[s_{pref}, s_{feed}, s_{len}] \quad \text{Equation 1}$$

In the above equation 1, the term "$s_{pref}$" may refer to encoding (vector representation/feature vector) of the customer's preference each of the product attribute. The intuition may be that the attribute with high predicted preference may be likely to receive positive feedback, which also helps to reduce the candidate space. For example, a feature vector is "$s_{pref}$" and "$s_{pref}$", may include certain attributes, and for all those product attributes, determine customer preference along the conversation, that forms encoding. The term "$s_{feed}$" may refer to the encoding (vector representation) of the conversation history of "T" turns where each dimension encodes customer's feedback at time "t1" for positive feedback and '0' for negative feedback. For example, for each of the product attributes, based on the utterances of the customer, the state/policy network 350 may encode and send additional utterances of the customer as additional parameter i.e., feedback. For example, when customer utters that "i'm not interested in red", the state/policy network 350 may check entire sentence and try to automate feature vector with the corresponding vector encoding.

The term "$s_{len}$" may refer to encoding that represents the current length of the conversation. For example, if the length is too long then the action would be to recommend the products instead of asking more questions on the customer's preferences. For example, at a particular point in time, a length of the conversation may be considered. For example, "$s_{len}$" is 4 turns for the conversation, the may also be passed as a feature vector, which may be crucial in predicting next action. For instance, the actions may be, but not limited to, whether to ask questions about attributes 1, 2, 3, . . . , N, on what attributes to ask the question. This may be hardcoded in the CME 106.

The output layer may be a soft-max layer which may provide a probability distribution across all product attributes "n" which further questions should be asked or a recommendation. The product attributes may be as shown in below equation 2:

$$a_t = [a_{attr1}, a_{attr2}, a_{attr3}, \ldots a_{attrn}, a_{rec}] \quad \text{Equation 2}$$

The goal of the state policy network 350 may be to learn an optimal policy that optimizes reward such as a positive reward when the customer 214 provides a positive feedback on the asked attribute, a strongly negative reward if the customer 214 quits the conversation or when the conversation may be long or lengthy.

The reward may be optimized to be maximum, and the reward may be based on customer feedback. If customer provides a positive feedback, then reward may be higher, and if the customer leaves the conversation then reward may be negative, and if the conversation may be long or lengthy then penalize the reward. The state policy network 350 may need to decide attributes to ask questions or even if no questions were asked then decide to directly recommend products.

The reward function may be defined as "$r_t$". If "θ" may represent the parameters of the state policy network 350, the goal may be to optimize using gradient descent such that the reward may be maximized. The parameters may be as shown in below equation 3:

$$P_\theta = E[\Sigma r(s_t, a_t)] \quad \text{Equation 3}$$

The action may be decided in real time based on the conversation from the customer or the action may be to recommend which may route the action to the automatic recommendation pipeline 354 which recommends products instead of asking more questions to the customer 214. The training of decision regarding the next action may be based on, for example, gradient decent method.

Figure 3F:
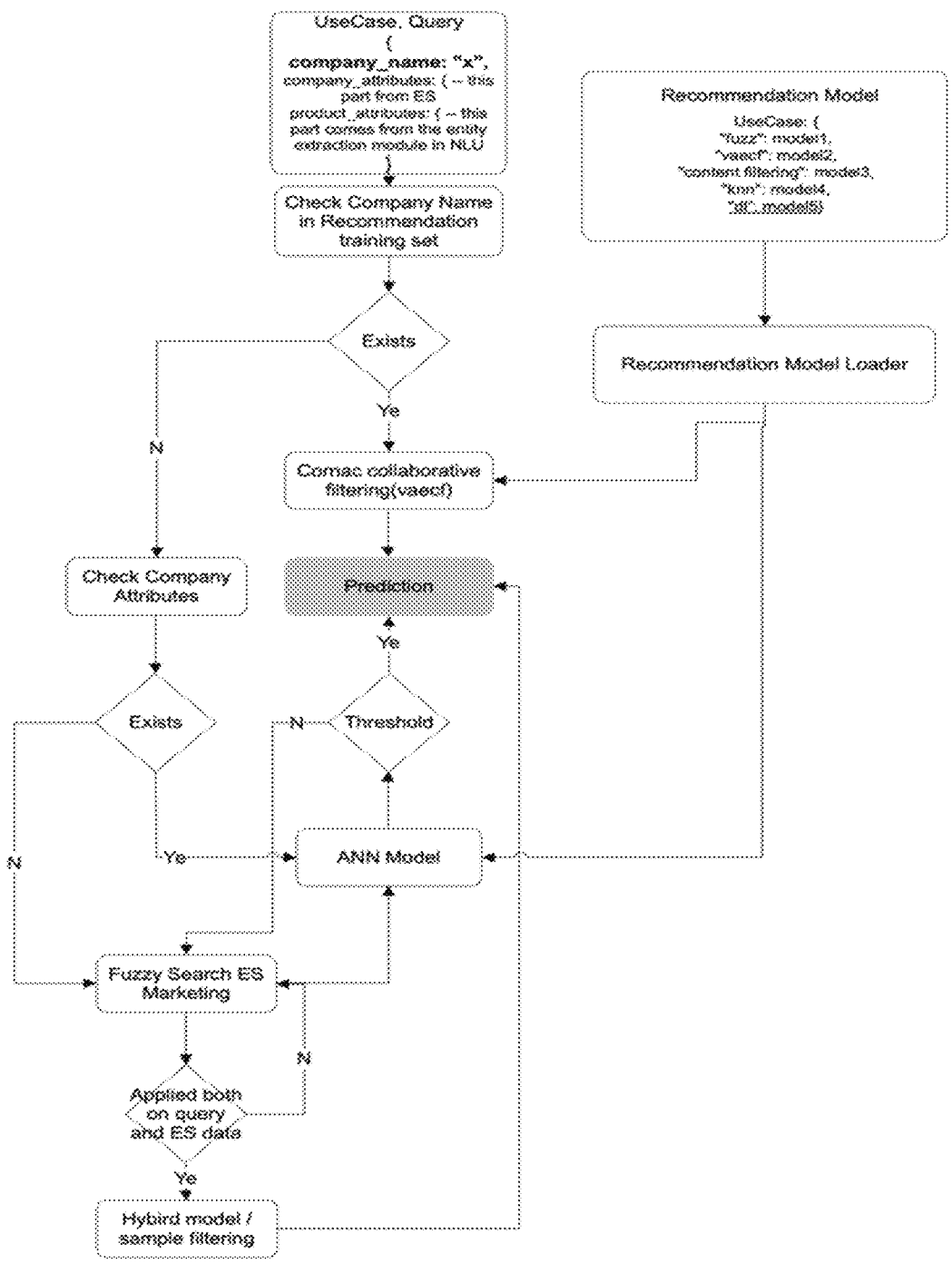
FIG. 3F illustrates an example flow diagram depicting an automatic recommendation pipeline of FIG. 3B, according to an example embodiment of the present disclosure.
Figures 3G, 3H:
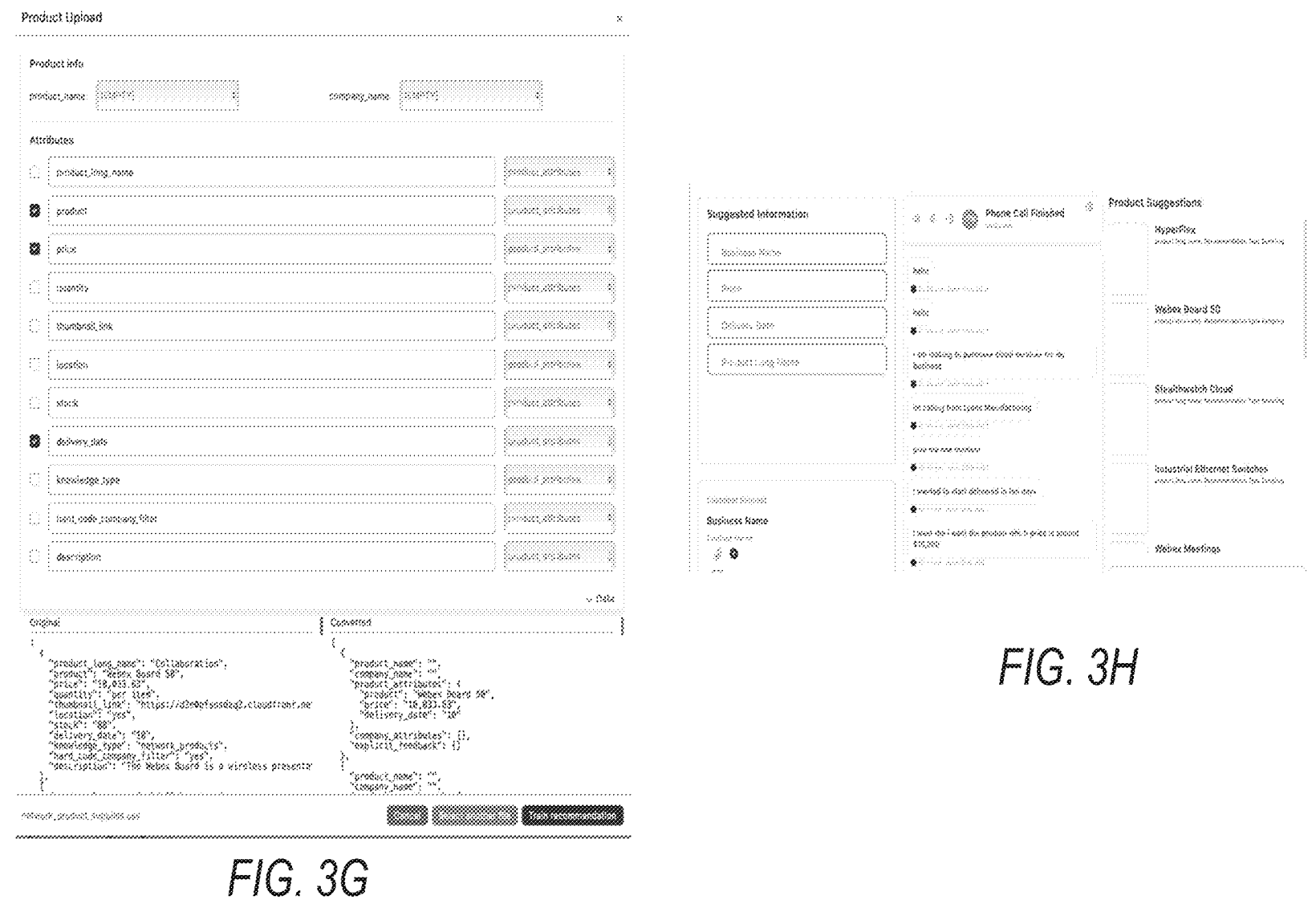

The state policy prediction network 350 may output parameters to the automatic recommendation pipeline 354. If the action detected by the state policy network 350 ($a_t$) may be to recommend, then the output of the NLU 352 may be sent to the recommender engine 108A, to build a question and predict to "k" nearest relevant products. In the automatic recommendation pipeline 354, for every use case registered in the real-time user interface 340, a recommendation pipeline may need to be built. However, it may be not efficient for the data scientist to manually build this from scratch every time a new case may be created. The automatic recommendation pipeline 354 as shown in FIG. 3F, may obtain the product catalog as the input and then allows the human agent 116 to map the product attributes to standard schema. The human agent 116 may trigger on "train" the following pipeline via an interface as shown in FIG. 3G. There may be no assumption on any parameter. Based on the attributes from the customer and the product that may be extracted sequentially in every turn of the conversation, the automatic recommendation pipeline 354 may be dynamically triggered and a corresponding flow of the automatic recommendation pipeline 354 may be activated of the dynamically triggered automatic recommendation pipeline 354. The automatic recommendation pipeline 354 may be built in an incremental fashion. In an instance, the input may be obtained as a use case and a question, however, the question may be incremental in nature. Based on the kind of information from the question, algorithms of different levels of complexity may be triggered as the automatic recommendation pipeline 354. Essentially, if the metadata attributes may be captured in the question, then the metadata attributes may be sent to complex recommender engine that can provide better prediction. However, in some instances, from the customer 214 question with rich text may not be anticipated. If customer calls and the customer may be not available in a customer database, then the customer data may be sent to a proximate nearest neighbor model which may integrate with a marketing database, so as to recommend products to similar companies.

For example, during training of the automatic recommendation pipeline 354, if the customer 214 had no user-item interaction data the automatic recommendation pipeline 354 may automatically detect that the user-item interaction data may be absent in the standard schema mapped by the human agent 116 during configuration and falls back to a fuzzy filtering model based on the product attributes. The human agent 116 can also pick and choose which attributes to be configured during the training process. In case, for example, a supervised learning model may not be available in the CVAP 104, that suits the need for the question, then attributes may be extracted from the conversation of the customer 214 and may perform fuzzy search by the CVAP 104, then send attributes to a hybrid model for example filtering to set out examples for products. A dynamic automatic recommendation pipeline 354 may need to be triggered based on the information from the question at a given point in the conversation. The conversation dynamic recommendation may be as shown in FIG. 3H. The automatic recommendation pipeline 354 may include but not limited to a fuzzy filtering model, a variational order encoder model, a collaborative filtering model, a content filtering model, and the like. For example, if a company name does not match that the collaborative filtering model may be trained, then the automatic recommendation pipeline 354 may be triggered by the CVAP 104. The k nearest neighbors may be searched, if an access is to only the attributes of the company. The k mean nearest algorithm may be used to find similar company from marketing data to recommend the products that the company has used. If the data, attributes of the company interested may be accessed in the database on the trained model, a deep learning model may be used.

The recommend products may be again sent to CME 106 as shown in FIG. 3B, which then formulates the response corresponding to the recommend products. The formulated response may be communicated to the human agent 116 for response to recommendation. Further, if the action detected by the policy network ($a_t$) may be to ask further questions to the customer, then the NLU output may be sent to the CME 106 to generate a natural language response probing more questions on the product attributes. The CME 106 may be a chat bot framework such as, but not limited to, a Dialog Flow®, Amazon Lex®, Rasa and so on.

Figure 3I:
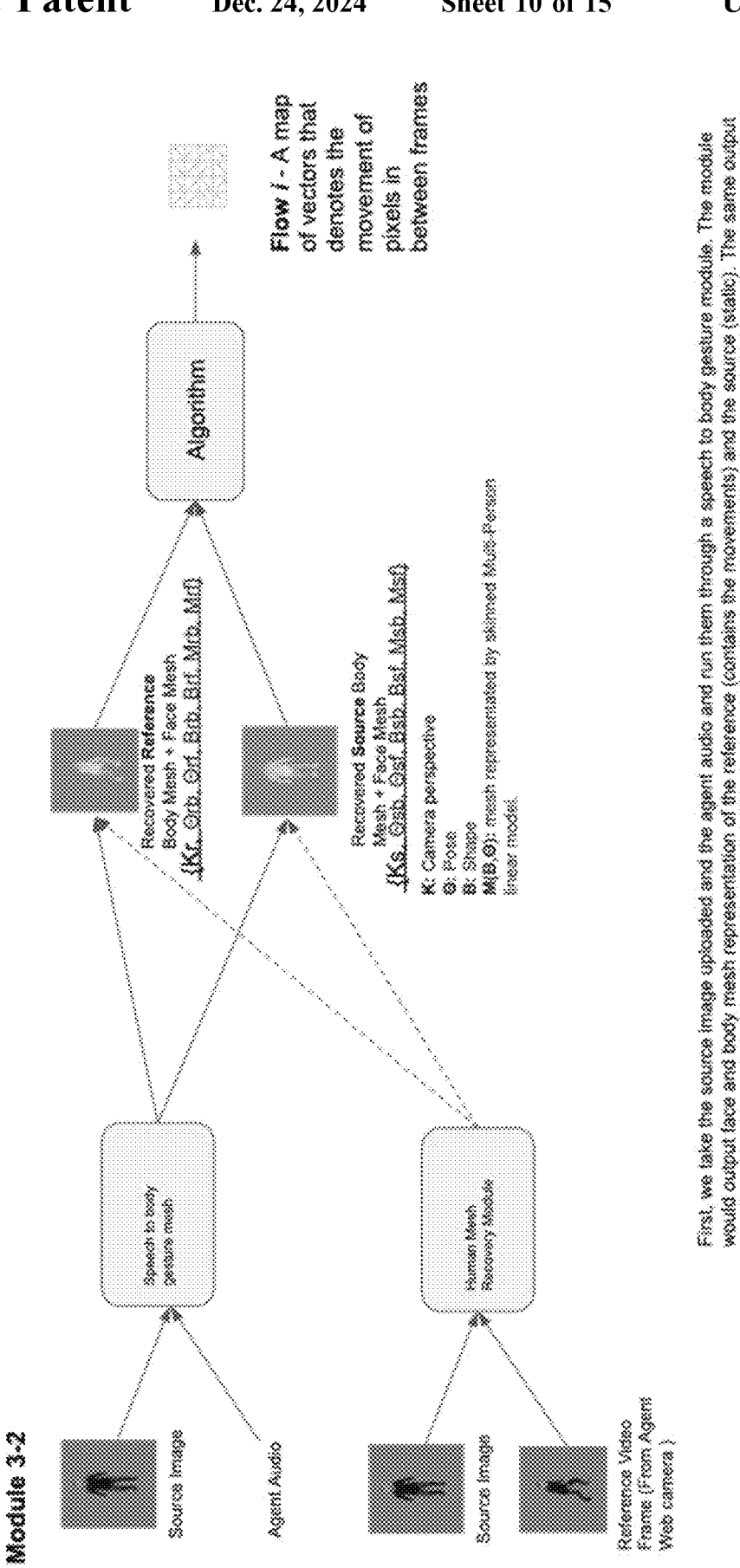
FIG. 3I illustrates flow diagram of communication between response to motion (RTM) module to Conversation Virtual Avatar Platform (CVAP), according to an example embodiment of the present disclosure.

FIG. 3I illustrates flow diagram of communication between response to motion (RTM) 114, to Conversation Virtual Avatar Platform (CVAP) 104, according to an example embodiment of the present disclosure.

Figure 3J:
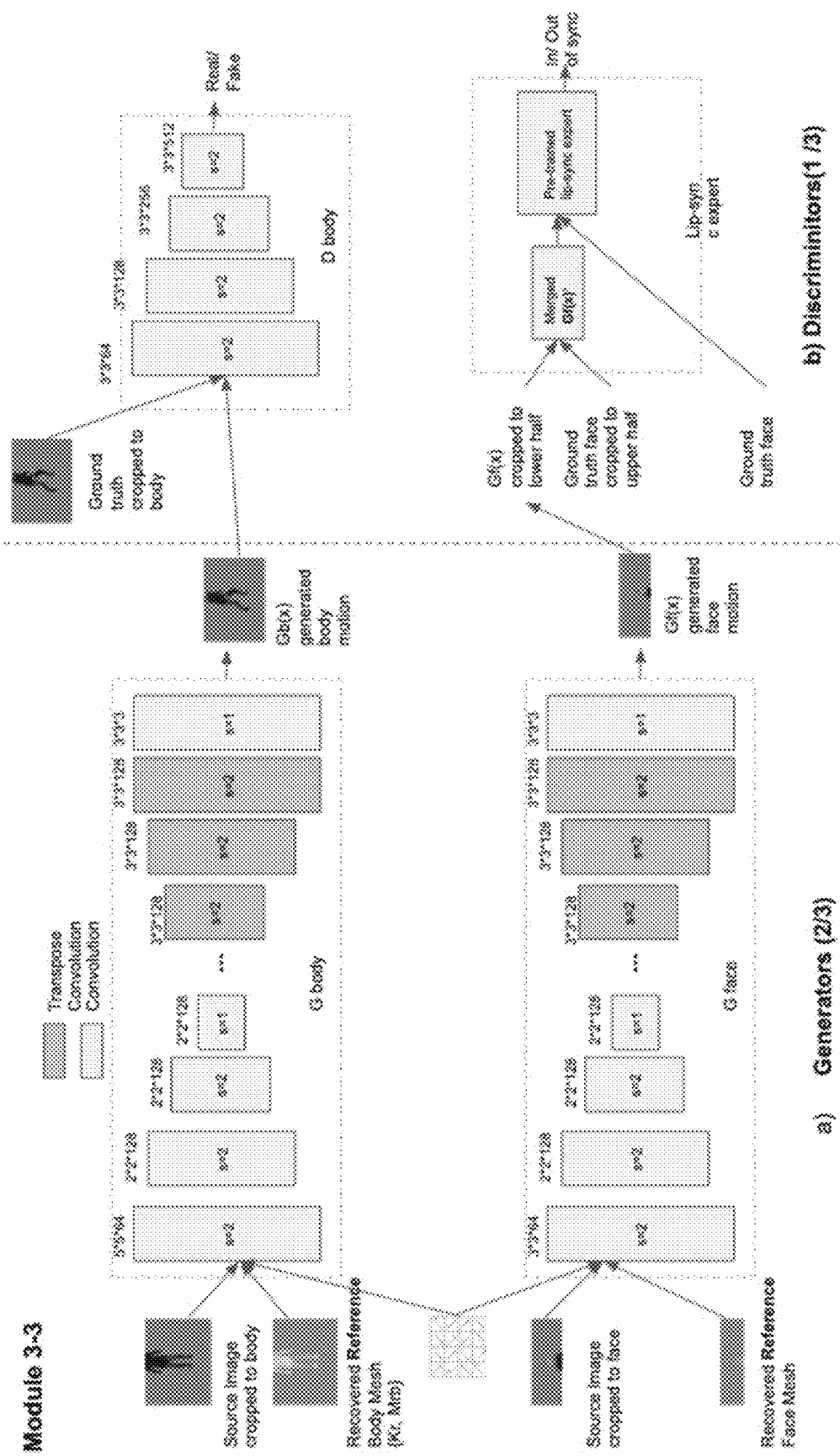
FIG. 3J illustrates flow diagram of response to motion module (RTM), according to an example embodiment of the present disclosure.

First step may be to upload source image and the human agent audio. The source image and the human agent audio may be provided to speech to body gesture module 362. The speech to body gesture module 362 may recover reference face and body (K (camera perspective), ⊙ (pose), B (shape), M (B, ⊙) (mesh represented by skinned multi-person liner model)) which may trace the movements of the source image (static), to provide similar output as the human agent movements. For instance, there may be three generators and three discriminators to form a generator and discriminator network. The generators may generate random outputs and the discriminator may check the output from the generator is desired or not. Consider generator 1 shown in FIG. 3J may be a body generator, and the generator 2 may be a body mesh generator, and generator 3 may be a flow parameter "i". The flow parameter "i" may denote the movement of pixels in between the frames of the image. The body motion frame may be mapped to ground truth frame and may use inputs to discriminator 1 and the discriminator may determine, if the input is generated or the ground truth input. The purpose of the discriminator 1 may be to ensure that the body movement quality. The generator 2 may be the face generator, generator 2 may receive source image cropped with face as shown in FIG. 3J, face mesh from previous flow parameter "i". The generator 2 may generate the face motion. The face mesh of upper half and body image of the lower half of ground truth may be generated to give full image. The full image may be provided to pre-trained lip synchronization generator 216B. The lip synchronization generator 216B may not be updated, whereas the generators and discriminators may be updated upon training. The purpose of the lip synchronization generator 216B may be to ensure lip synchronization quality. For instance, response to motion (RTM) 114 and CVAP 104 may produce, for interface time of 3-second-long video to reduce latency, an original frame of ($250s$-$300s$), changing batch size for face detection ($200s$-$250s$), pre-generated face detection of driving video ($8s$-$9s$), changing batch size for lip synchronization ($7s$-$8s$), parallel Graphical User Interface (GUI) processing for lip synchronization ($6s$-$7s$).

Figure 3K:
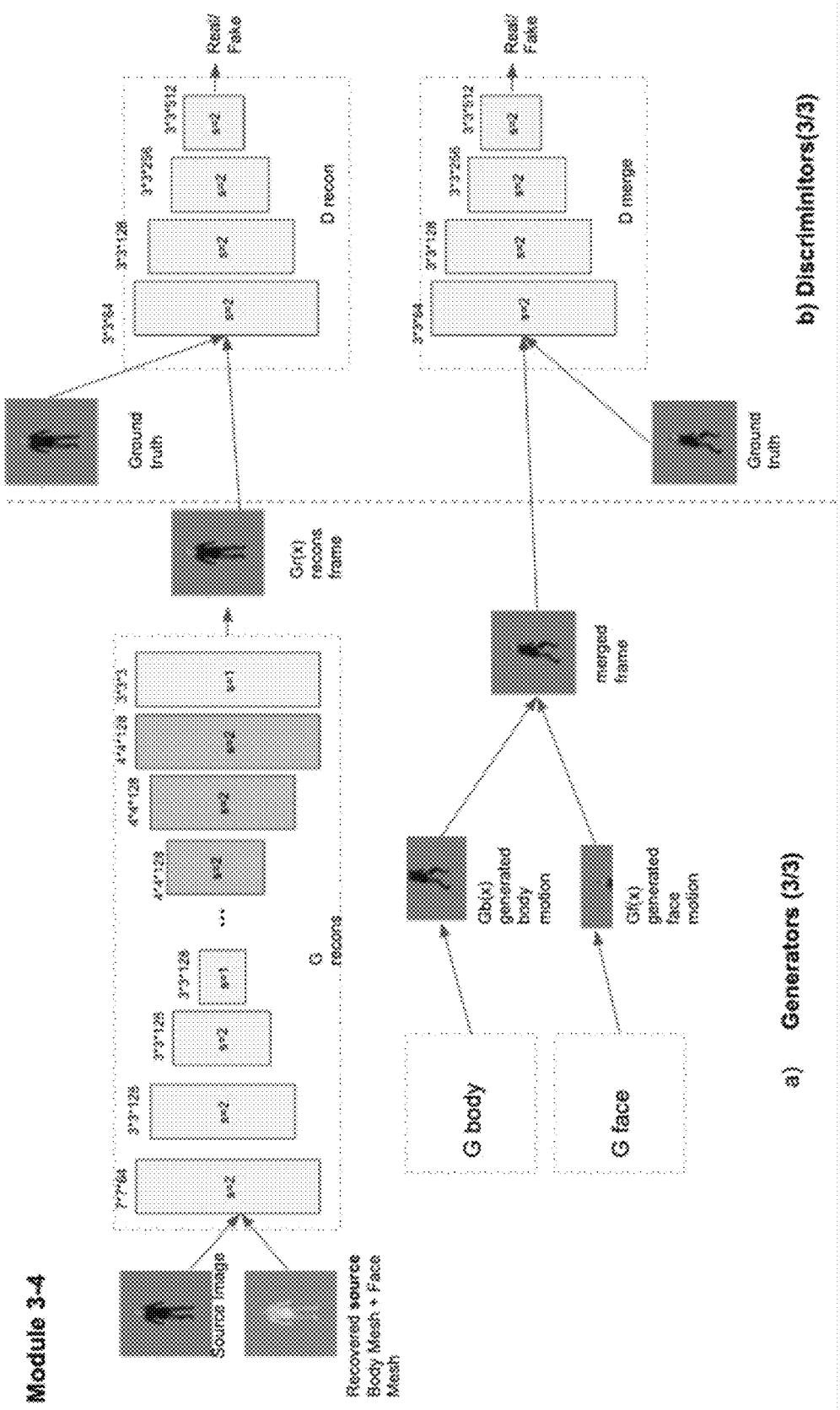
FIG. 3K illustrates flow diagram of communication between response to motion module (RTM) to Virtual Avatar (VA), according to an example embodiment of the present disclosure.

In an instance, the generator 3 may be a reconstruction generator. The generator 3 may receive source image and the reference body mesh and the face mesh from previous parameters as shown in FIG. 3K. The generator 3 may return to reconstruct the original source frame. The output of the network (generator and discriminator network) may map with the ground truth again and provide to discriminator 2, which may discriminate the reconstructed frame and the ground truth frame. This is performed to ensure that the output maintains the same graphics according to the source image.

The output from generator 1 and generator 2 may be concatenated to merge frames which may contain body and face movements. The merged frames may be sent to discriminator 3. The discriminator 3 may distinguish the concatenated image from the ground truth frame. The purpose is to look seamless between the face and body. Further, the entire body image can be generated from only audio or entire body image can be based on body movements. The body motions may be predicted from direct audio or drive the body motions directly from the human agent's movements from a web camera. The RTME 114 may synthesize the static image from different motions using discriminator-generator approach. Seamlessly transfer between the human agent 116 or just the audio. There may be no need to hardcode any body movements for VA 118, the body movements may be by synthesized based on the human agent 116. The VA 118 may run on the web interface 222, which may be lite on the web interface 222.

Figure 3L:
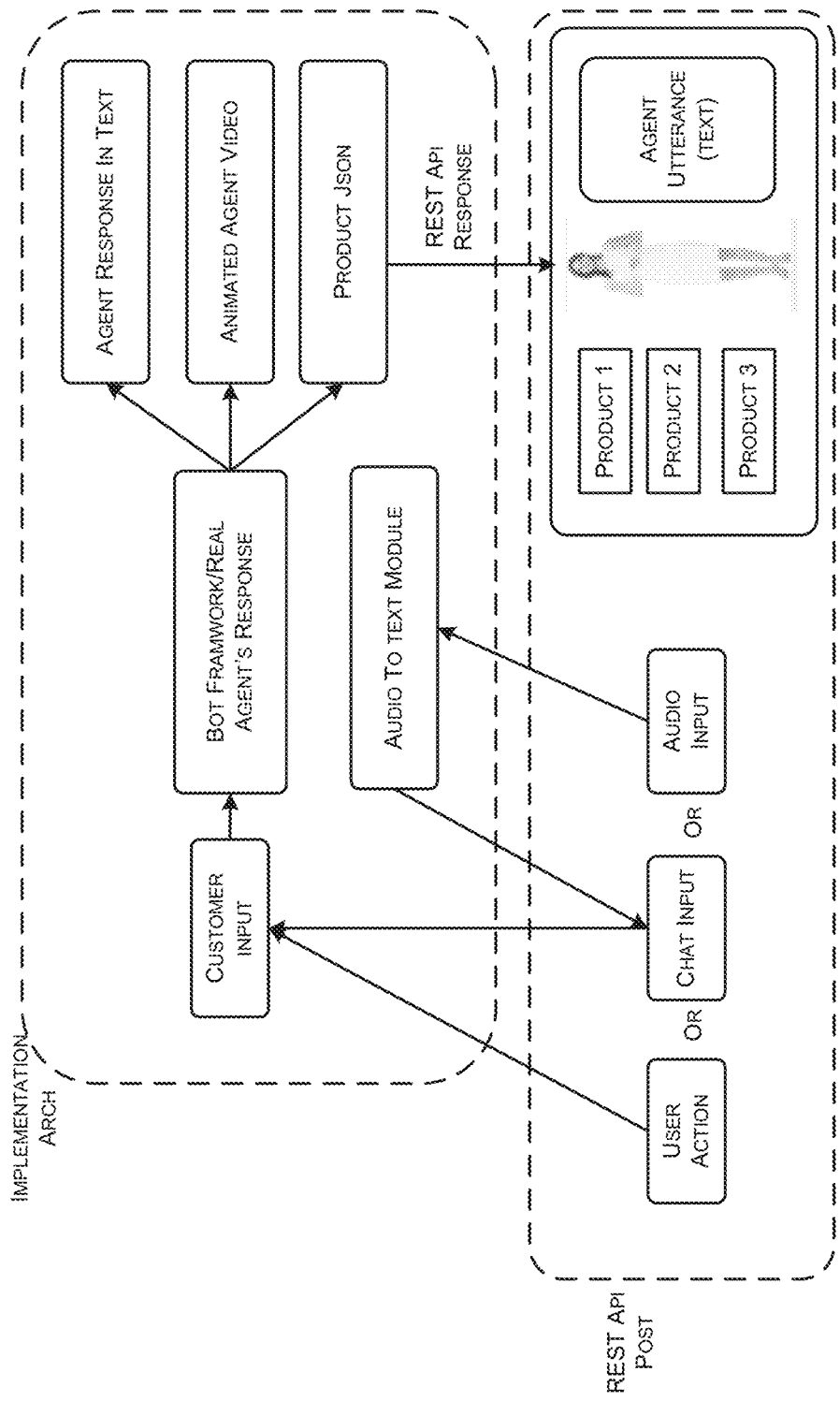
FIG. 3L illustrates flow diagram of implementation architecture of system of FIG. 2), according to an example embodiment of the present disclosure.

FIG. 3L illustrates flow diagram of implementation architecture of system of FIG. 2), according to an example embodiment of the present disclosure. The customer 214 input may be inputted to chatbot framework. Further the human agent 116 may provide response via video and audio. The response audio and video may be animated and the response such as product recommendation may be provided to the VA 118 to the customer.

Figure 4:
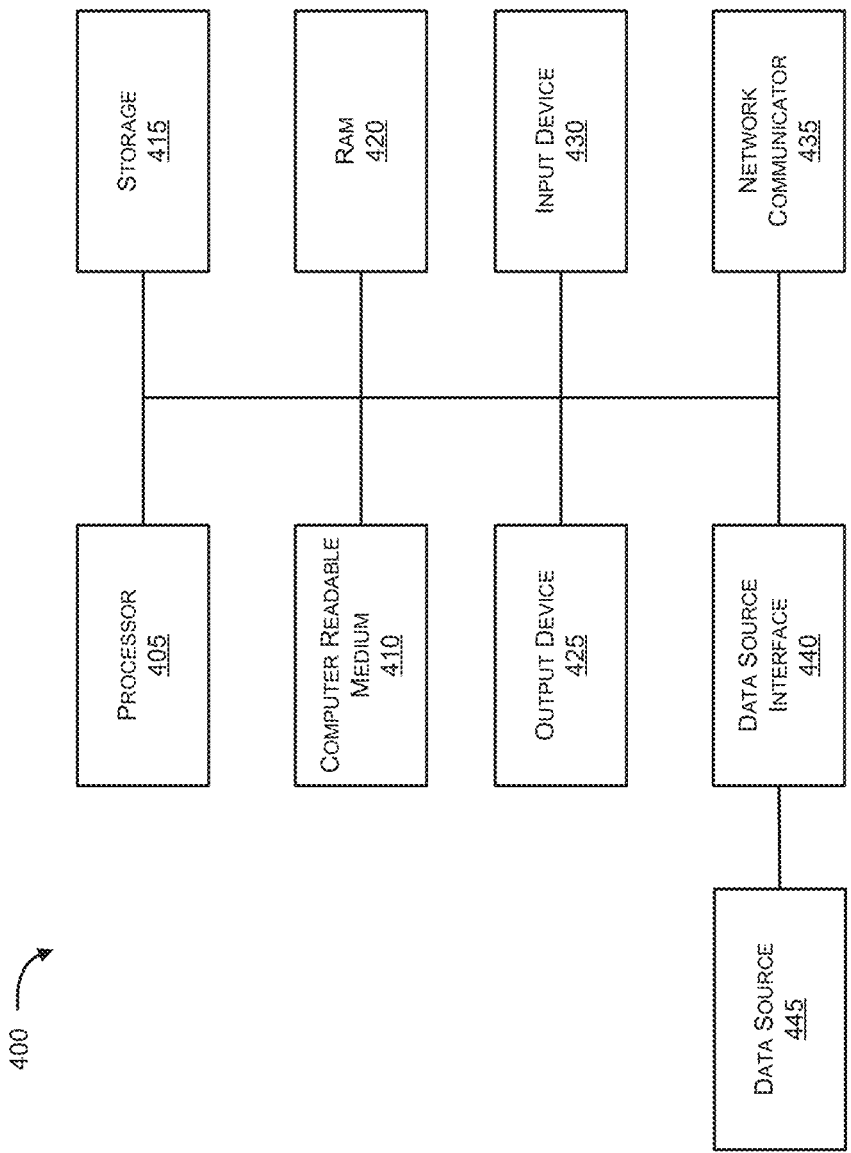
FIG. 4 illustrates a hardware platform for implementation of the disclosed system, according to an example embodiment of the present disclosure.

FIG. 4 illustrates a hardware platform 400 for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 400. As illustrated, the hardware platform 400 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 400 may be a computer system such as the system 100 that may be used with the embodiments described herein. The computer system may represent a computational platform that includes components that may be in a server or another computer system. The computer system may execute, by the processor 405 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 405 that executes software instructions or code stored on a non-transitory computer-readable storage medium 410 to perform methods of the present disclosure. The software code includes, for example, instructions to gather data and documents and analyze documents. In an example, the CVAP 104, lead prioritization engine 110, RTME 114, may be software codes or components performing these steps.

The instructions on the computer-readable storage medium 410 are read and stored the instructions in storage 415 or in random access memory (RAM). The storage 415 may provide a space for keeping static data where at least some instructions could be stored for later execution. The stored instructions may be further compiled to generate other representations of the instructions and dynamically stored in the RAM such as RAM 420. The processor 405 may read instructions from the RAM 420 and perform actions as instructed.

The computer system may further include the output device 425 to provide at least some of the results of the execution as output including, but not limited to, visual information to users, such as external agents. The output device 425 may include a display on computing devices and virtual reality glasses. For example, the display may be a mobile phone screen or a laptop screen. GUIs and/or text may be presented as an output on the display screen. The computer system may further include an input device 430 to provide a user or another device with mechanisms for entering data and/or otherwise interact with the computer system. The input device 430 may include, for example, a keyboard, a keypad, a mouse, or a touchscreen. Each of these output devices 425 and input device 430 may be joined by one or more additional peripherals. For example, the output device 425 may be used to display the results such as bot responses by the executable chatbot.

A network communicator 435 may be provided to connect the computer system to a network and in turn to other devices connected to the network including other clients, servers, data stores, and interfaces, for instance. A network communicator 435 may include, for example, a network adapter such as a LAN adapter or a wireless adapter. The computer system may include a data sources interface 440 to access the data source 445. The data source 445 may be an information resource. As an example, a database of exceptions and rules may be provided as the data source 445. Moreover, knowledge repositories and curated data may be other examples of the data source 445.

Figure 5:
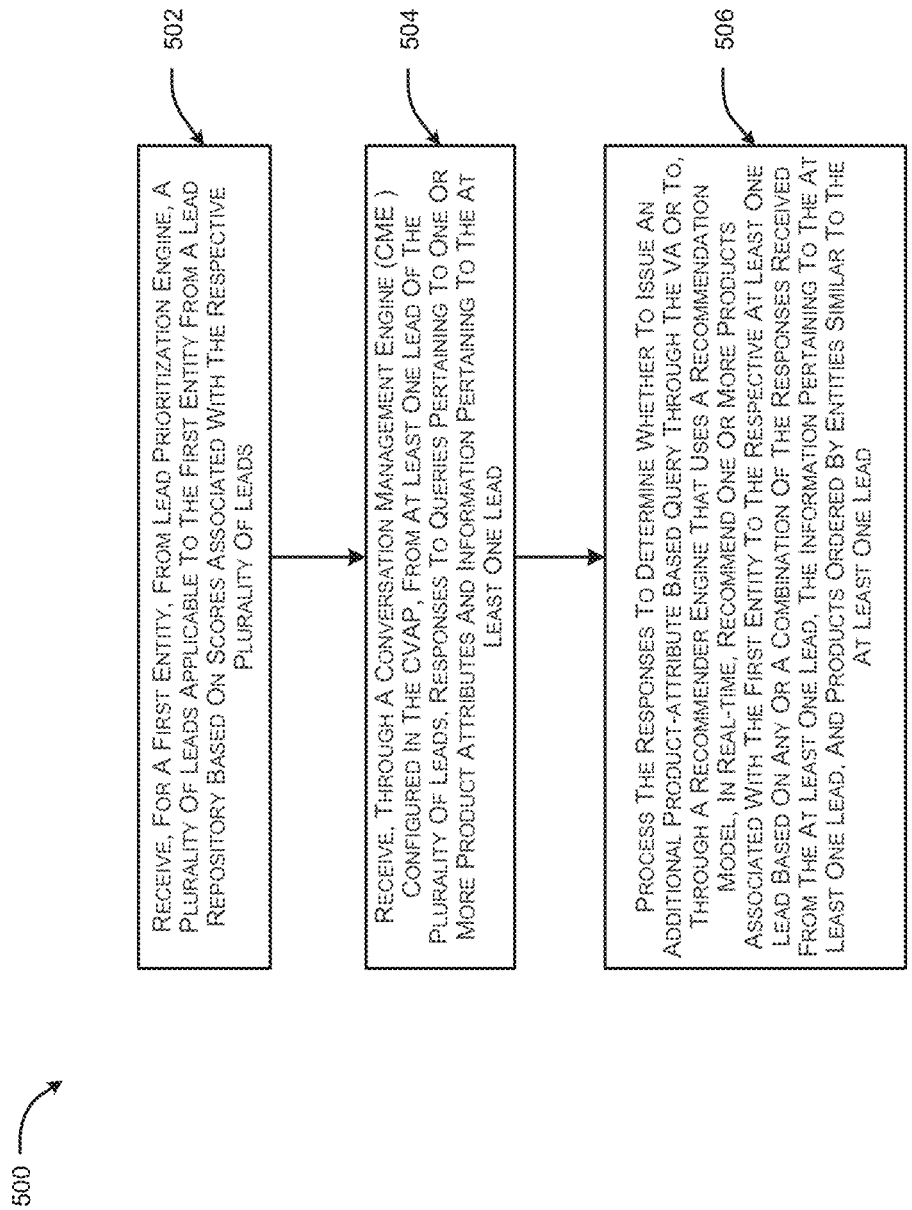
FIG. 5 illustrates a flow diagram depicting method of lead conversion using conversational virtual avatar, according to an example embodiment of the present disclosure.

FIG. 5 illustrates a flow diagram depicting method 500 of lead conversion using conversational virtual avatar, according to an example embodiment of the present disclosure.

At block 502, the method 500 may include receiving, by the CVAP 104 via the processor 102, for a first entity, from lead prioritization engine 110, a plurality of leads applicable to the first entity via a lead repository 112 based on scores associated with the respective plurality of leads.

At block 504, the method 500 may include receiving, by the CVAP 104 via the processor 102, through a conversation management engine (CME) 106 configured in the CVAP 104, from at least one lead of the plurality of leads, responses to questions pertaining to one or more product attributes and information pertaining to the at least one lead. The questions may be issued through a Virtual Avatar (VA) 118 that is associated with the CME 106. The questions pertaining to the one or more product attributes may incrementally generated through a slot-filling mechanism, and wherein the recommender engine 108A may also triggered based on the slot-filling mechanism. The VA 118 may be a virtual hybrid avatar that is configured such that, based on processing of the responses, upon determination that a human response is required for next action during interaction with the at least one lead, an audio and/or video response of a human agent 116 may be issued to the at least one lead through the CME 106 such that the at least one lead continues seamless interaction during the session.

At block 504, the method 500 may include determining, by the CVAP 104 via the processor 102, process the responses to determine at least one of an action and state, which includes whether to issue an additional product-attribute based question through the VA 118 or to, through a recommender engine 108A that uses a recommendation model 108B, in real-time, recommend one or more products associated with the first entity to the respective at least one lead based on any or a combination of the responses received from the at least one lead, the information pertaining to the at least one lead, and products ordered by entities similar to the at least one lead. The recommender engine 108A may be associated with an automatic recommendation pipeline 354 that may be triggered at each instance of the determination. The determining at least one of an action and state, is decided by a state/policy network based on vector representations associated with product-attribute preferences of the at least one lead, feedback from conversation history of past leads, and current length of the conversation. The recommendation model 108B may be selected from, but not limited to, fuzzy filtering model, Variational Autoencoder for Collaborative Filtering (VAECF), content filtering model, k-Nearest Neighbour model, and deep learning model. The recommendation model 108B may be selected based on intent classifications and slots/entities that are extracted from the responses to the questions pertaining to one or more product attributes, and further selected based on parameters associated with the first entity and the information pertaining to the at least one lead.

The order in which the method 500 are described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein.

Furthermore, the method 500 may be implemented in any suitable hardware, software, firmware, or a combination thereof, that exists in the related art or that is later developed. The method 500 describe, without limitation, the implementation of the system 100. A person of skill in the art will understand that method 500 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a conversational Virtual Avatar platform (CVAP) operatively coupled with a processor that causes the platform to:
receive, for a first entity, from a lead prioritization engine, a plurality of leads applicable to the first entity from a lead repository based on scores associated with the respective plurality of leads;
receive, through a conversation management engine (CME) configured in the CVAP, from at least one lead of the plurality of leads, responses to questions pertaining to one or more product attributes and information pertaining to the at least one lead, wherein the questions are issued through a Virtual Avatar (VA) that is associated with the CME; and
process the responses to determine at least one of an action and state, which comprises whether to issue an additional product-attribute based question through the VA or to, through a recommender engine that uses a recommendation model, in real-time, recommend one or more products associated with the first entity to the respective at least one lead based on any or a combination of the responses received from the at least one lead, the information pertaining to the at least one lead, and products ordered by entities similar to the at least one lead, wherein the recommender engine is associated with a recommendation pipeline that is triggered at each instance of the determination;
predict, via a response to motion engine (RTME) operatively coupled to the CVAP, pose coordinates from the responses, using a multi-modal neural network architecture, wherein the predicted pose coordinates are combined with a lip synchronization and facial expressions for translation onto a static source image corresponding to the VA to generate required motions, wherein the predicted pose coordinates are translated onto the static source image by:
extracting, via a body generator associated with the multi-modal neural network architecture, a body portion from the source image, a reference body mesh, and a flow to generate body motion frames corresponding to the pose coordinates;
extracting, via a face generator associated with the multi-modal neural network architecture, a face portion from the source image, a reference face mesh, and a flow to generate face motion frames corresponding to the pose coordinates; and mapping the pose coordinates with the facial expressions, the lip synchronization, body movements, body poses, and face motion of an agent to motions of the VA via the reference body mesh and the reference face mesh;

predict, via a lead action prediction engine, the action to be performed corresponding to the plurality of leads based on the scores of the plurality of leads, based on receiving responses to the generated required motions of the VA; and output, via a lead generation workbench, the plurality of leads to the agent, to receive a feedback from the agent to train the lead generation workbench based on the received feedback.

2. The system as claimed in claim 1, wherein the questions pertaining to the one or more product attributes are incrementally generated through a slot-filling mechanism, and wherein the recommender engine is also triggered based on the slot-filling mechanism.

3. The system as claimed in claim 1, wherein the VA is a virtual hybrid avatar that is configured such that, based on processing of the responses, upon determination that a response is required for a next action during interaction with the at least one lead, an audio and/or video response of the agent is issued to the at least one lead through the CME such that the at least one lead continues seamless interaction during a session.

4. The system as claimed in claim 1, wherein the source image is processed with audio of the agent to generate a recovered reference body/face mesh, and wherein the source image is processed with a reference video frame from a camera of the agent to generate a recovered source body/face mesh such that the reference and source meshes are processed through a vector transformation to generate a flow that is indicative of VA's movement.

5. The system as claimed in claim 1, wherein the image of the VA is generated based the corresponding agent.

6. The system as claimed in claim 1, wherein the recommendation model is selected from any or a combination of fuzzy filtering model, Variational Autoencoder for Collaborative Filtering (VAECF), content filtering model, k-Nearest Neighbour model, and deep learning model.

7. The system as claimed in claim 1, wherein the recommendation model is selected based on intent classifications and slots/entities that are extracted from the responses to the questions pertaining to one or more product attributes, and further selected based on parameters associated with the first entity and the information pertaining to the at least one lead.

8. The system as claimed in claim 1, wherein determining at least one of an action and state, is decided by a state/policy network based on vector representations associated with product-attribute preferences of the at least one lead, feedback from conversation history of past leads, and a current conversation.

9. A method for lead conversion using conversation virtual avatar, the method comprising:

receiving, by a processor via a Conversational Virtual Avatar Platform (CVAP), for a first entity, from a lead prioritization engine, a plurality of leads applicable to the first entity from a lead repository based on scores associated with the respective plurality of leads;

receiving, by the processor via the CVAP, through a conversation management engine (CME) configured in the CVAP, from at least one lead of the plurality of leads, responses to questions pertaining to one or more product attributes and information pertaining to the at least one lead, wherein the questions are issued through a Virtual Avatar (VA) that is associated with the CME; and processing, by the processor via the CVAP, the responses to determine at least one of an action and state, which comprises whether to issue an additional product-attribute based question through the VA or to, through a recommender engine that uses a recommendation model, in real-time, recommend one or more products associated with the first entity to the respective at least one lead based on any or a combination of the responses received from the at least one lead, the information pertaining to the at least one lead, and products ordered by entities similar to the at least one lead, wherein the recommender engine is associated with a recommendation pipeline that is triggered at each instance of the determination;

predicting, by the processor via the CVAP, pose coordinates from the responses, using a multi-modal neural network architecture, wherein the predicted pose coordinates are combined with a lip synchronization and facial expressions for translation onto a static source image corresponding to the VA to generate required motions, wherein the predicted pose coordinates are translated onto the static source image by:

extracting, by the processor via a body generator associated with the multi-modal neural network architecture, a body portion from the source image, a reference body mesh, and a flow to generate body motion frames corresponding to the pose coordinates;

extracting, by the processor via a face generator associated with the multi-modal neural network architecture, a face portion from the source image, a reference face mesh, and a flow to generate face motion frames corresponding to the pose coordinates; and mapping, by the processor, the pose coordinates with the facial expressions, the lip synchronization, body movements, body poses, and face motion of an agent to motions of the VA via the reference body mesh and the reference face mesh;

predicting, by the processor via the CVAP, the action to be performed corresponding to the plurality of leads based on the scores of the plurality of leads, based on receiving responses to the generated required motions of the VA; and outputting, by the processor via the CVAP, the plurality of leads to the agent, to receive a feedback from the agent to train the lead generation workbench based on the received feedback.

10. The method as claimed in claim 9, wherein the questions pertaining to the one or more product attributes are incrementally generated through a slot-filling mechanism, and wherein the recommender engine is also triggered based on the slot-filling mechanism, wherein the VA is a virtual hybrid avatar that is configured such that, based on processing of the responses, upon determination that a response is required for next action during interaction with the at least one lead, an audio and/or video response of a agent is issued to the at least one lead through the CME such that the at least one lead continues seamless interaction during the session.

11. The method as claimed in claim 9, wherein the source image is processed with audio of the agent to generate a recovered reference body/face mesh, and wherein the source image is processed with a reference video frame from camera of the agent to generate a recovered source body/face mesh such that the reference and source meshes are processed through a vector transformation to generate a flow that is indicative of VA's movement.

12. The method as claimed in claim 9, wherein the recommendation model is selected from any or a combination of fuzzy filtering model, Variational Autoencoder for Collaborative Filtering (VAECF), content filtering model, k-Nearest Neighbour model, and deep learning model.

13. The method as claimed in claim 9, wherein the recommendation model is selected based on intent classifications and slots/entities that are extracted from the responses to the questions pertaining to one or more product attributes, and further selected based on parameters associated with the first entity and the information pertaining to the at least one lead, wherein determining at least one of an action and state is decided by a state/policy network based on vector representations associated with product-attribute preferences of the at least one lead, feedback from conversation history of past leads, and a current conversation.

14. A non-transitory computer readable medium, wherein the readable medium comprises machine executable instructions that are executable by a processor to:
   receive, via Conversational Virtual Avatar Platform (CVAP), for a first entity, from a lead prioritization engine, a plurality of leads applicable to the first entity from a lead repository based on scores associated with the respective plurality of leads;
   receive, through a conversation management engine (CME) configured in the CVAP, from at least one lead of the plurality of leads, responses to questions pertaining to one or more product attributes and information pertaining to the at least one lead, wherein the questions are issued through a Virtual Avatar (VA) that is associated with the CME; and
   process the responses to determine at least one of an action and state, which comprises whether to issue an additional product-attribute based question through the VA or to, through a recommender engine that uses a recommendation model, in real-time, recommend one or more products associated with the first entity to the respective at least one lead based on any or a combination of the responses received from the at least one lead, the information pertaining to the at least one lead, and products ordered by entities similar to the at least one lead, wherein the recommender engine is associated with a recommendation pipeline that is triggered at each instance of the determination;
   predict, via a response to motion engine (RTME) operatively coupled to the CVAP, pose coordinates from the responses, using a multi-modal neural network architecture, wherein the predicted pose coordinates are combined with a lip synchronization and facial expressions for translation onto a static source image corresponding to the VA to generate required motions, wherein the predicted pose coordinates are translated onto the static source image by:
   extracting, via a body generator associated with the multi-modal neural network architecture, a body portion from the source image, a reference body mesh, and a flow to generate body motion frames corresponding to the pose coordinates;
   extracting, via a face generator associated with the multi-modal neural network architecture, a face portion from the source image, a reference face mesh, and a flow to generate face motion frames corresponding to the pose coordinates; and
   mapping the pose coordinates with the facial expressions, the lip synchronization, body movements, body poses, and face motion of an agent to motions of the VA via the reference body mesh and the reference face mesh;
   predict, via a lead action prediction engine, the action to be performed based on the plurality of leads based on the scores of the plurality of leads, based on receiving responses to the generated required motions of the VA; and
   output, via a lead generation workbench, the plurality of leads to the agent, to receive a feedback from the agent to train the lead generation workbench based on the received feedback.

* * * * *